(12) United States Patent
Bjorkegren

(10) Patent No.: US 9,858,244 B1
(45) Date of Patent: *Jan. 2, 2018

(54) SAMPLING A PART OF A CONTENT ITEM

(75) Inventor: Michael Erik Carl Bjorkegren, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 763 days.

This patent is subject to a terminal disclaimer.

(21) Appl. No.: 13/534,507

(22) Filed: Jun. 27, 2012

(51) Int. Cl.
*G06F 15/16* (2006.01)
*G06F 17/11* (2006.01)

(52) U.S. Cl.
CPC .................................. *G06F 17/11* (2013.01)

(58) Field of Classification Search
CPC . H04L 67/28; H04L 67/2847; H04L 65/4084; H04L 65/403; H04L 47/822; H04L 9/085; H04L 63/08; G06F 17/21; G06F 17/211; G06F 17/2247; G06F 17/24
USPC ........................................................ 709/204
See application file for complete search history.

(56) References Cited

U.S. PATENT DOCUMENTS

| | | | | |
|---|---|---|---|---|
| 5,125,205 A | * | 6/1992 | Wichman | A47F 5/13 40/610 |
| 7,546,602 B2 | * | 6/2009 | Hejlsberg | G06F 9/54 717/114 |
| 8,402,385 B1 | * | 3/2013 | Clark | G06F 3/0485 715/784 |
| 8,692,763 B1 | | 4/2014 | Kim | |
| 8,816,956 B2 | * | 8/2014 | Ludwig | G06F 3/0346 345/156 |
| 2003/0193524 A1 | * | 10/2003 | Bates | G09G 5/14 715/786 |
| 2004/0125124 A1 | | 7/2004 | Kim et al. | |
| 2005/0091604 A1 | | 4/2005 | Davis | |
| 2006/0045470 A1 | * | 3/2006 | Poslinski | H04N 5/44513 386/297 |
| 2006/0256083 A1 | | 11/2006 | Rosenberg | |
| 2007/0055926 A1 | | 3/2007 | Christiansen et al. | |
| 2008/0163039 A1 | | 7/2008 | Ryan et al. | |
| 2008/0168359 A1 | | 7/2008 | Flick et al. | |

(Continued)

OTHER PUBLICATIONS

Office Action for U.S. Appl. No. 13/534,921, dated Oct. 6, 2014, Bjorkegren, "Representing of Consumption Digital Content", 39 pages.

(Continued)

*Primary Examiner* — Sm Rahman
(74) *Attorney, Agent, or Firm* — Lee & Hayes, PLLC

(57) ABSTRACT

In some implementations, a user may use an electronic device to sample and/or share a sample of content of a content item. Furthermore, the electronic device may display a consumption representation in connection with the content item that may represent locations of parts of content that have been received as samples out of an expanse of content of the content item. In some examples, a user may select a portion of the content to sample based at least in part on one or more aspects or features of the content item, such as may be represented in a content representation. Further, a content provider may track an amount of content that is sent to the electronic device or other electronic devices associated with the same user account to limit the amount of content that may be provided as samples for each content item.

18 Claims, 14 Drawing Sheets

(56) References Cited

U.S. PATENT DOCUMENTS

| | | |
|---|---|---|
| 2010/0023259 A1 | 1/2010 | Krumm et al. |
| 2010/0241961 A1 | 9/2010 | Peterson et al. |
| 2012/0079372 A1 | 3/2012 | Kandekar et al. |
| 2012/0216118 A1 | 8/2012 | Lin et al. |
| 2012/0311438 A1* | 12/2012 | Cranfill et al. ............... 715/256 |

OTHER PUBLICATIONS

Office action for U.S. Appl. No. 13/534,921, dated Sep. 29, 2015, Bjorkegren, "Representing Consumption of Digital Content", 32 pages.
Final Office Action for U.S. Appl. No. 13/534,921, dated Apr. 23, 2015, Michael Erik Carl Bjorkegren, "Representing Consumption of Digital Content", 26 pages.
Office Action for U.S. Appl. No. 13/534,921, dated Aug. 30, 2016, Bjorkegren, "Representing Consumption of Digital Content", 11 pages.

\* cited by examiner

1100

RECEIVE A FIRST PART OF A CONTENT ITEM AS A FIRST SAMPLE AND A SECOND PART OF THE CONTENT ITEM AS A SECOND SAMPLE, SUCH THAT THE FIRST PART OF CONTENT ITEM IS NONCONTIGUOUS WITH THE SECOND PART OF THE CONTENT ITEM
1102

DISPLAY A REPRESENTATION OF CONTENT OF THE CONTENT ITEM, THE REPRESENTATION INDICATING A LOCATION IN THE CONTENT OF AT LEAST THE FIRST SAMPLE AND THE SECOND SAMPLE
1104

```
┌─────────────────────────────────────────────────────────────┐
│ RECEIVING, FROM A DEVICE, AN INDICATION OF AT LEAST A START │
│ LOCATION, WITHIN AN EXPANSE OF CONTENT OF A CONTENT ITEM, OF│
│ A PART OF THE CONTENT TO SAMPLE, THE START LOCATION BEING   │
│ ONE OF A PLURALITY OF START LOCATIONS AVAILABLE WITHIN THE  │
│                    EXPANSE OF CONTENT                        │
│                            1302                              │
└─────────────────────────────────────────────────────────────┘
                              │
                              ▼
┌─────────────────────────────────────────────────────────────┐
│              SEND THE PART OF THE CONTENT TO THE DEVICE      │
│                              1304                            │
└─────────────────────────────────────────────────────────────┘
```

FIG. 13

SAMPLING A PART OF A CONTENT ITEM

BACKGROUND

The continued proliferation of digital content items has led to an increase in the availability of such content items, as well as an increase in the availability of electronic devices and applications used for consuming these content items. For instance, users consume content items, such as electronic books (eBooks), digital videos, digital songs, digital images, and the like, on an assortment of electronic devices. As the number of content items and devices for consuming content items continues to increase, users are ever more interested in enhancing their experiences when consuming digital content, while providers of digital content continue to seek new ways of exposing content to potential consumers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 is a flow diagram illustrating an example process that may be executed by an electronic device for sharing a content item according to some implementations.

FIG. 13 is a flow diagram illustrating an example process that may be executed by a computing device of a content provider in connection with providing a sample of a content item according to some implementations.

DETAILED DESCRIPTION

Figure 1:
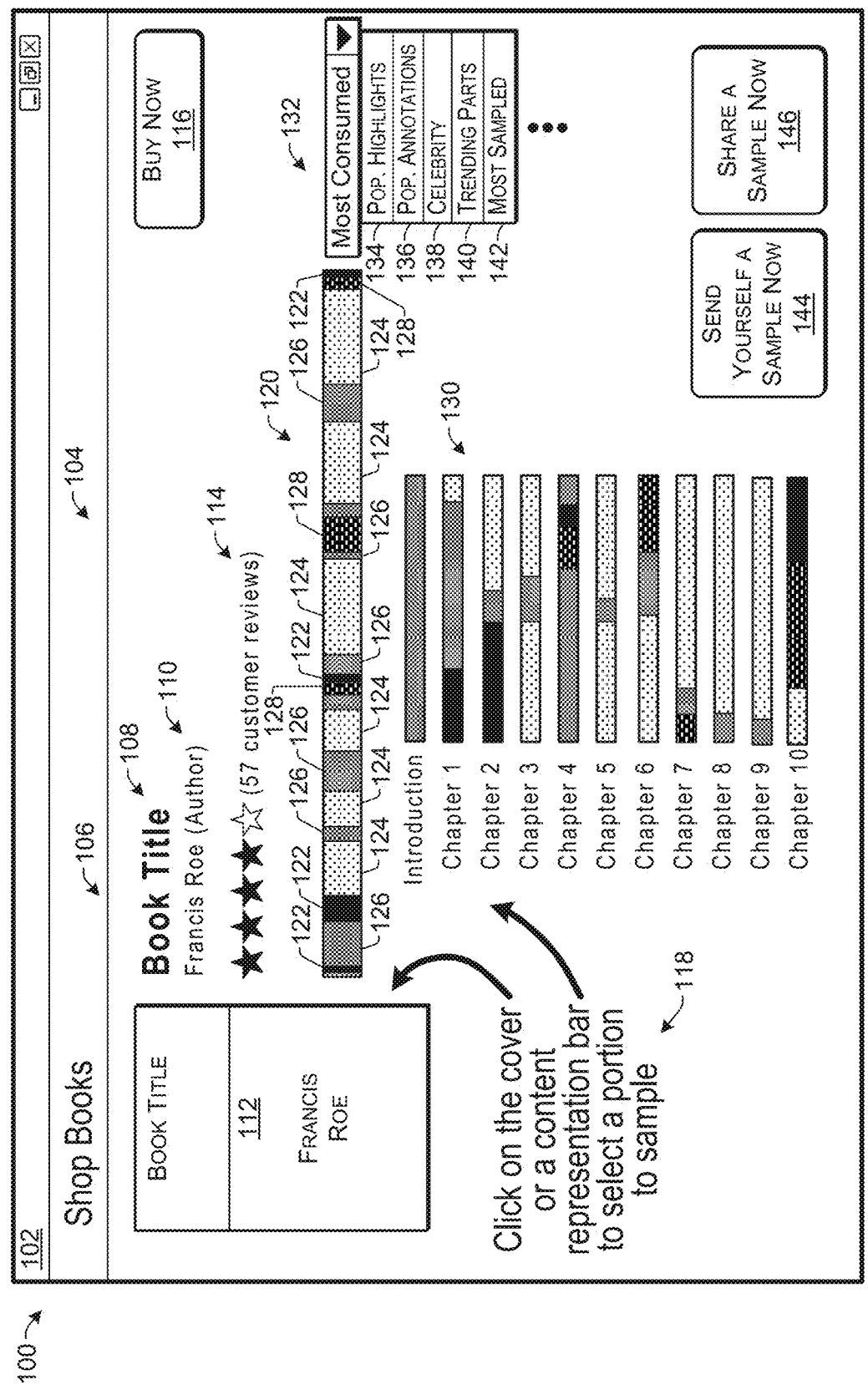
FIG. 1 illustrates an example interface to enable sampling of content according to some implementations.

This disclosure includes techniques and arrangements for sampling and/or sharing sample portions or parts of content of a digital content item, such as a book, video, audio recording, or the like. For instance, a user may be permitted to sample one or more parts of a content item in an out-of-order, nonlinear or otherwise noncontiguous fashion. Accordingly, rather than receiving a single fixed-size sample that starts at the beginning of the content item and proceeds in a contiguous and linear fashion to the end of the allotted size of the sample, the user may prefer to sample one or more parts of content at any desired starting location in the content item. For example, the user may be permitted to sample a certain amount of the content, such as a specified percentage of the content (e.g., 5%, 7%, 10%, etc.) from any desired location within the content. Alternatively, rather than a percentage amount of the content, the user may be permitted to access a specified number of pages, chapters, sections, locations, playback time intervals, frames, angles, and so forth, depending on the type of content item being sampled.

The user may be presented with a sample consumption representation that represents the location and amount of the content sampled out of an expanse of content of the content item. Accordingly, while the user is consuming the sample content and/or thereafter, a consumption representation may be displayed to provide a visual indication of one or more locations in the content item of one or more parts of content that have been accessed, received or otherwise sampled by the user. The user may further be presented with an indication of how much content of the content item the user has already sampled, and/or how much more content the user may still be permitted to sample until the user reaches the maximum permitted sample amount. When the user has sampled the permitted amount of content, the user may be prevented from obtaining any further samples of the particular content item. For example, the user may continue to be able to peruse the sample part of the content after the maximum amount of sample content has been received, but attempts to obtain additional sample content are prevented. In some instances, attempts to obtain additional sample content may result in the content provider offering a pay-per-part access plan in which the user may be charged on a per page basis, a per word basis, or the like.

In one example, suppose that a user of an electronic device is interested in acquiring a book, e.g., either a physical book or an electronic book (eBook), such as a work of fiction, a textbook, a reference book, a children's book, or any other type of book. The user may access a site of a content provider to view a sample of the book. The content provider may allow the user to sample a specified amount of the book, such as a percentage of the total content of the book or other portion of content of the book. For example, the sample content may be provided free of charge to a user as an incentive to encourage the user to purchase or otherwise acquire full access to the book or other content item. The user may elect to sample only certain parts of the book, such as certain pages, chapters, sections, or the like, while skipping other parts of the book. The content provider may keep track of which parts of the book the user has sampled and which parts the user has skipped over. Further, the content provider may send consumption information to the user's device to enable the user's device to present a visual depiction of the parts skipped and the parts sampled in a consumption representation displayed to the user. Additionally, the content provider may provide an indication to the user of the percentage of the sample content that the user has consumed and/or a percentage remaining that the user is permitted to sample. When the user has accessed or received the maximum allowed amount of sample content, the user may be invited to purchase the content item.

As another example, suppose that a first user would like to share a part of a content item with a second user and/or post a link to the part of the content item on a social network site (e.g., Facebook®), a microblog site (e.g., Twitter®), a wiki site (e.g., Wikipedia®), or the like, so that one or more other users may read, view, or otherwise access the part of the content item. In some cases, the sampling framework discussed above may be employed to implement these scenarios. For example, the first user may be presented with an interface that enables the first user to select a part of content having a content quantity that is within an allowable sample limit, as discussed above. The interface may further enable the first user to compose a message to be sent to the second user and/or posted to a desired network location. The content provider may receive an identification of the content item, an indication of the selected part to be shared, the message from the first user, if any, and instructions as to how or with whom the selected part is to be shared. The content provider may generate a link, uniform resource locator (URL) or other network location identifier for the content item and the selected part of the content item. The content provider may then send the network location identifier, the message from the first user, if any, and an invitation to select the network location identifier to view the shared content to the designated recipient, e.g., a second user, the social network site, the microblog site, etc. As another alternative, the network location identifier may be provided back to the first user, who may then post or send the network location identifier to a desired recipient. When the second user or another user selects the network location identifier, they may be presented with an interface to enable them to sample the shared part of the content item and/or other parts of the content item up to an allowable sample limit, in a manner similar to that described above.

For discussion purposes, some example implementations are described in the environment of providing samples and/or sharing parts of content items. However, the implementations herein are not limited to the particular examples provided, and may be extended to other types of content items, other types of sampling techniques, and other types of user interfaces, as will be apparent to those of skill in the art in light of the disclosure herein.

Example Interfaces

FIG. 1 illustrates an example user interface 100 that may be presented to a user, such as during shopping for a content item, browsing through content items, or the like, according to some implementations. The user interface 100 may include a window 102 accessed by the user, such as may be provided by a content provider site, or the like, and which may be accessed by the user through a web browser, an application, a device, a kiosk, or other functionality, as discussed additionally below. The window 102 may contain an offer 104 of a content item 106, which in this example is a book. For example, with respect to the particular content item 106, the offer 104 may include a title 108 of the content item, the name 110 of the author of the content item, an image 112 of the cover of the content item, and a summary of and link to user reviews 114 of the content item. The offer 104 may further include a selectable button or control 116, which may be selected by the user to purchase or otherwise acquire the content item. For example, the user may purchase a physical copy of the content item, i.e., a print book in this example. Additionally, or alternatively, the user may purchase a digital version of the content item, which may be downloaded or otherwise made available to an electronic device of the user, such as according to a license agreement or the like.

The interface 100 may further include an invitation 118 for the user to electronically sample a part of the content item 106 prior to making a decision as to whether to purchase the particular content item. As one nonlimiting example, the user may click on the cover 112 to view a sample of the content item 106. For example, if the user clicks on the cover 112, the user may be presented with a sample that starts at the beginning of the book, such as at the front cover, a cover page, an introduction, a table of contents, or page one, depending at least in part on the actual contents of the particular book.

Alternatively, rather than starting the sample at the beginning of the book, the user may be able to select a particular part of the content item 106 to sample, such as from anywhere within the content item. Thus, the user may be able to select a start location for a sample from among a plurality of available start locations anywhere within the content of the book, rather than having to start the sample at the beginning of the book. For example, the user may select portions to sample in a noncontiguous and nonlinear manner.

Various interfaces and techniques may be provided to enable the user to select one or more particular or random parts of the content item to sample. As one example, the user may be provided with a content representation 120 in the form of a bar or other suitable graphic element or representation, such as an of a pie chart, pie graph, histogram, heat map, graph, or the like, that represents at least a portion of the content of the content item 106 and the location of particular parts of content in a proportional location along the content representation 120. For instance, the content representation 120 may be displayed in a left-to-right configuration, with a beginning of the content corresponding to a left side, and an end of the content corresponding to the right side of the content representation 120. Accordingly, as one example, the user may click on, or otherwise select, a particular location on the content representation 120 to select a start location of a sample of the content. Alternatively, the user may select a particular location on the content representation and be presented with a pop-up interface, or the like, that identifies a start location and asks the user to enter the number of pages to include in this sample portion. As another alternative, the sample may have a start and end location corresponding to a selected visually distinguished portion of the content representation, as discussed below.

The content representation 120 may represent various different aspects or features of the content to provide the user with some indications or clues as to which parts of the content item 106 may be interesting to sample. In the illustrated example, the content representation 120 represents an aspect of the content that pertains to the parts of the content item 106 that have been most read or most consumed by other users that have purchased, read, accessed, or otherwise consumed the content item 106. For example, the content provider may receive, from a plurality of other users, consumption information related to the consumption progress of each user through a particular content item. Thus, the content provider may have obtained consumption information from a plurality of users that have read this particular content item 106. The content provider may aggregate, merge, combine, compare or otherwise employ this information to determine which parts of the content item 106 users spend the most time reading, rereading, skimming, skipping over, and the like. Accordingly, the content representation 120 may display aggregated multi-user consumption information that shows which parts of the book have been most frequently accessed or consumed by other users. In this example, darker or more heavily patterned portions 122 of the representation 120 may indicate heavily trafficked or frequently consumed parts of the book, while lighter portions 124 may represent less frequently consumed parts of the book, and portions 126, 128 that are shaded or colored in between the dark portions 122 and light portions 124 may represent graduations or gradations between the lighter and darker portions, i.e., portions of content having a consumption level between the lightly consumed portions 124 and the heavily consumed portions 122. Accordingly, the content representation 120 includes various portions 122, 124, 126 and 128 that are visually distinguished from each other to indicate various levels or degrees of a particular aspect of the content. Furthermore, while this example shows boundaries between the various visually distinguished portions, in other examples, the representation 120 may be similar to a heat map in which the boundaries are blurred or more gradual. Additionally, numerous other types of graphic representations may present the same or similar information, such as histograms, pie charts, graphs, and the like. Accordingly, implementations herein are not limited to any particular graphic representation of the content representation 120.

In addition, as indicated at 130, the content representation 120 may be further granulated or broken down into representations of individual chapters or sections of a book, tracks of an album, chapters of a video, and the like. For example, in the case of a book that includes chapters, the aggregated consumption information may be represented according to each chapter of the book, as illustrated in FIG. 1, to enable the user to select more finely or with greater granularity a particular part of the content that may be of interest for sampling. The chapter granulation 130 may be presented in addition to, or as an alternative to, the content representation 120.

In some examples, the user may be able to magnify or otherwise enlarge the content representation 120 to enable the user to select more accurately a particular portion of the content to sample. Accordingly, the content provider may offer the user the opportunity to sample a part of the book and the user may be able to select the part to sample based on the indications in content representation 120 of the aggregated consumption information regarding which parts are most popular among users who have actually read the book. Similarly, in the case that the content item is a song or movie, the user may select a part to sample based on the parts that are most listened to or most viewed by other users who have already purchased the content item.

Furthermore, as another example, the aggregated consumption information presented in the content representation 120 to a particular user may be personalized for that user. For instance, the user's profile, past purchases, and the like, may be matched with a profile of other users who have consumed the content item 106, and the consumption information from only those other users that have a commonality with the particular user may be used when generating the aggregated consumption information to be displayed in the content representation 120. This may result in a representation of aggregated consumption information is more useful to a particular user since the representation 120 may be based at least in part on the user's own interests, reading habits, and the like.

In addition, the user may be provided with the opportunity to select a different aspect or feature of the content to be displayed in the content representation 120. For example, a drop-down menu 132 or other functionality may be included in the interface 100 to enable the user to select one or more other aspects of the content to be displayed in the content representation 120. Thus, the content representation 120 may be changed through the dropdown menu 132 to display various other content aspects or features, such as popular highlights 134, popular annotations 136, a celebrity's consumption information 138, content that is currently trending 140, content that is most sampled 142, and so forth.

Selection of the popular highlights 134 aspect may result in the display in the content representation 120 of the locations of those parts of content that have been highlighted most frequently by other users that have read the book. For example, when a user highlights a particular part of a book or other content item, this information may be sent to the content provider and aggregated by the content provider to determine which parts of a particular book have been highlighted most frequently by a plurality of users that have read the book.

Similarly, with respect to popular annotations 136, when a user enters a note or other annotation into a book this information may also be sent to the content provider and used by the content provider to identify those locations in the content that have been annotated most frequently by a plurality of users that have read the book. Thus, a location of the popular annotations may be displayed on the content representation 120 to indicate to a user which parts of the content may be interesting to sample.

As another example, as indicated at 138, one or more celebrities may have agreed to share publically their consumption progress for the content item (such as through a paid endorsement or otherwise). The content representation 120 may be configured to display which parts of the content item 106 are currently being consumed by the celebrities, which parts of the content item 106 a certain celebrity read the most, or the like. Further, any notes, highlights, or other annotations made by the celebrity may also be made available for sampling or viewing by a user, and the locations of the annotations may be marked or otherwise represented in the content representation.

As still another example, the content provider may track various social network feeds (e.g., Facebook®), microblog feeds (e.g., Twitter®), RSS feeds, news feeds, discussion forums, and the like, to identify any parts of the particular content item 106 that are currently trending or otherwise being referenced or popularly discussed in any of these or other sources. Accordingly, the user may select the trending menu item 140 to have a location of any trending content displayed on the content representation 120 and thereby enable selection of a sample from that part. Alternatively, the menu item may enable the user to select a part of content corresponding to one or more terms in the content item. For example, the content item may be been categorized (such as with a machine learning system), and terms believed of particular interest in the content item may be identified. For example, the locations of particular topics, name, places, etc., which may be of interest to the user may be shown in the content representation 120.

Additionally, the most sampled menu item 142 may enable the user to view which parts of the content item 106 have been selected for sampling most frequently by other users. Further, numerous other types of content aspects and features may be presented in the content representation 120 and may be selected or activated through the menu 132 or by other suitable user interface techniques. For example, the content representation 120 may be configured to represent content that has been tagged by one or more users as a recommended part to be sampled by other users. Thus, a user may tag a portion of the content as "of interest to people who might be sampling," such as in anticipation of receiving some reward, such as a referral bonus or the like. As another example, rather than breaking out the individual chapters of a book, as in the representation 130, the user may toggle on a chapters feature to have the chapter breaks displayed on the content representation 120.

As still another example, the user may be able to view the consumption information associated with a particular reviewer. For example, suppose that a user "joe_smith_123" left a review as a reviewer for a book, such as a reference book. Further, suppose that the reviewer complains that the first few chapters are lousy, and he gave up reading halfway through the book. Accordingly, if the reviewer decides to allow sharing of his consumption history for that book, then other users would be able to see which pages the reviewer read, and possibly, whether the reviewer did much doubling back, rereading of pages, and so forth. The other users may also be able to see that the reviewer stopped reading the book about halfway through. As another example, a reviewer may leave a review in which the reviewer gives a content item a five-star rating, and says, e.g., "best book ever!", but the reviewer's consumption history at the time of reviewing the content item, may show that the reviewer had at that point only read the first chapter. Consequently, numerous different aspects and features of the content of the content item 106 may be displayed to the user to enable the user to determine which part of the content the user would like to sample.

Additionally, in some examples, rather than having the drop-down menu 132, some or all of the content aspects or features may be displayed simultaneously or contemporaneously, such as in a plurality of content representations 120 displayed in alignment, one above the other, in the interface 100. Thus, in some examples, a plurality of content representations 120 may be displayed in the interface 100, with each content representation 120 being directed to one or more different content aspects or content features. Furthermore, the foregoing aspects and features are merely some examples that that are provided for discussion purposes in the implementations herein and numerous other aspects, features and content representations will be apparent to those of skill in the art having the benefit of the disclosure herein. Furthermore, various other graphics and interface techniques may be provided in addition to, or instead of, the content representation 120 for selecting nonlinear or non-contiguous parts of content to sample.

In some examples, as a result of user selection of a part of content to sample, one or more chunks or pieces of content corresponding to the selection may be streamed to the user's device, downloaded to the user's device, or otherwise sent to be displayed on the user's device. As several examples, the selected part may be displayed by the opening of a new window or browser tab, overlaying of the sample content on the interface 100, opening of a window or frame inside the window 102, or the like. As another alternative, as indicated by a control 144, the user may elect to send a sample to another one of the user's devices. For example, suppose that the user is shopping using a PC or laptop but would prefer to read the sample or otherwise view the sample on a different device, such as a tablet computing device, eBook reader, a media player, or the like. Accordingly, the user may select the control 144 to be presented with an interface to select or indicate a particular device of the user to which the sample should be sent.

As another example, suppose that the user has already read the content item 106, or already viewed the sample content, and would like to share a sample of the content item with another user, such as a friend, or the like. Accordingly, the first user may select a control 146 to send a link, URL, or other network location identifier for the selected sample part to the second user. For example, following selection of the control 146, the first user may be presented with a pop-up interface to enter an email address or other identifier of the second user. The first user may further enter a message to the second user, click send, and a link to the selected sample part may be sent to the second user, such as in an email, instant message, text message, or the like. Alternatively, if the second user has an account with the content provider, the content provider may identify the account of the second user, such as based on an email address provided by the first user, and the content provider may send a link to the sample directly to a device associated with the account of the second user, along with a message that the first user has sent the link to the second user. As discussed below, when the second user receives the communication, the second user may click on or follow the network location identifier to be presented with the selected sample part of the content item 106.

Figure 2:
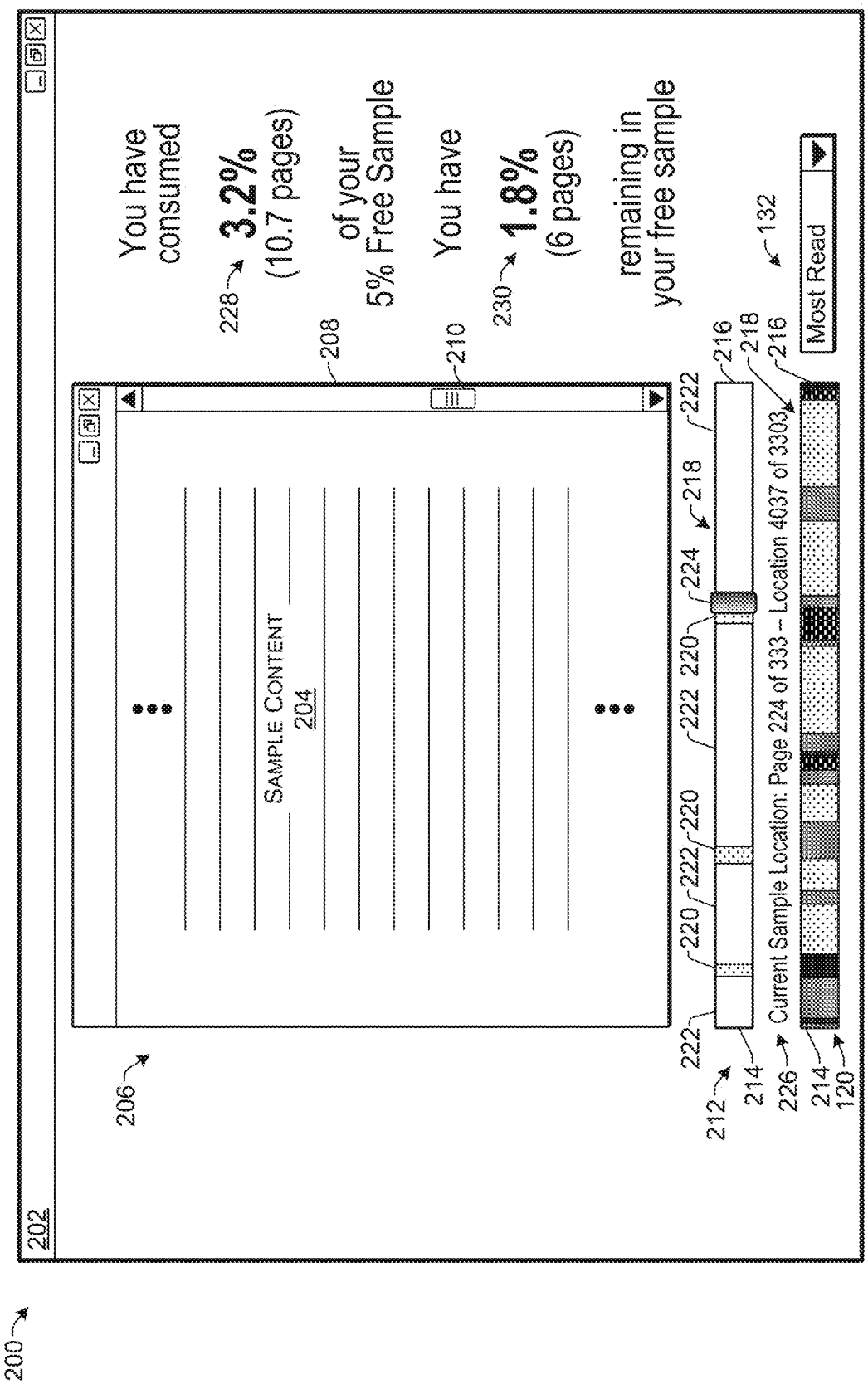
FIG. 2 illustrates an example of sampling a part of a content item according to some implementations.

FIG. 2 illustrates an example interface 200 that may be presented to the user following selection of a part of the content item to sample according to some implementations. As mentioned above, the interface 200 may be opened in a separate window 202, may be overlaid on top of the interface 100 in the same window 102, or may be presented on another device associated with the user in response to the user requesting that the sample be sent to a different device of the user (e.g., by selection of the control 144 as discussed above). Furthermore, in the situation discussed above in which a first user sends a link for a selected sample to a second user, an interface similar to that illustrated in FIG. 2 may be displayed to the second user when the second user selects the received network location identifier to access the shared sample content.

In the example of FIG. 2, the interface 200 includes a part 204 of sample content that is displayed in the interface 200 in any suitable manner such as within a frame or presentation window 206, or the like, depending on the type of device and/or software used to access the sample content. In some examples, the sample content may be streamed to the user's device for presentation in the interface 200. For example, one or more pieces of content of the content item 106 may be streamed or otherwise sent to the user device for display in the presentation window 206. Thus, the content provider may match the requested sample with one or more pieces of content of the content item 106 and may deliver only the identified pieces to the user's device. For instance, in the case of a book, the pieces may be segmented and organized according to pages of the book, locations identified in the book, such as by invariant referencing, or by any other suitable technique for matching pieces of content to identifiable parts of the content item. Similarly, with respect to an audio or video recording, pieces may be identified according to a location in the playtime, frame segments, or other suitable techniques. In some cases, the content item 106 may be separated in advance into pieces, such as discrete units or chunks of data, and the pieces may be stored with the content item 106 to facilitate high performance streaming. In other examples, one or more content pieces may be extracted from a content item in response to a sample request, such as in real time.

In the illustrated example, the frame 206 containing the sample content 204 includes a scrollbar 208 having a scroll handle 210 that may be manipulated to scroll through or otherwise view the sample content 204. In other examples, however, the sample content 204 may be contained in a frame or user interface in a single page view. For example, the single page view may be responsive to touch inputs, such as swiping, or other input devices and techniques, for traversing through the sample content 204 on a page-by-page basis. For example, a user may use any suitable input technique to cause the interface to replace a first displayed page with a next successive page. Various other techniques for displaying sample content will be apparent to those of skill in the art in light of the disclosure herein.

The interface 200 may further include a sampled content representation 212, which in some examples may proportionally represent the sizes and locations of the one or more parts of content sampled by the user for the content item 106. For example, the sampled content representation 212 may include a first side 214 and a second side 216 with an area 218 extending there between that represents the content of the content item 106. For example, the content represented in this example may be pages 1-333 of the content item. The content representation 120 described above with respect to FIG. 1 may be similarly configured, and may also be displayed in the interface 200. In the illustrated examples, the areas 218 of the sampled content representation 212 and the content representation 120 are rectangular, but implementations herein are not limited to any particular configuration for the areas 218. The sampled content representation 212 may be vertically aligned with the content representation 120 to provide the user with an indication of the relative locations of the parts of the content item that have been sampled as well as potential locations of any additional parts that the user may desire to sample before exhausting the permitted amount of sample content. Accordingly, the sampled content representation 212 may include one or more visually distinguished portions 220 that represent parts of content that have been sampled by the user and that are visually distinguished from one or more other portions 222 of the sampled content representation 212 that are representative of content that has not been sampled by the user.

The sampled content representation 212 may further include a handle 224 that may be manipulated to slide along the length of the content representation 212, and that may be used by the user to play backward, advance, return to, re-access, or otherwise view the sample content 204. For example, the handle 224 may be displayed on the sampled content representation 212 at a location that corresponds to a current location of sample content 204 displayed in the sample content frame 206. Furthermore, the current sample location may also be identified textually, as indicated at 226, such as by specifying the page number or location number of the currently presented sample content within the content of the content item. Should the user desire to return to a part of sample content previously viewed, the user may simply slide the handle 224 along the sampled content representation 212 to the location of the previously viewed sample content.

As mentioned above, the content representation 120 described above with reference to FIG. 1 may be aligned with the sampled content representation 212, and the user may use the content representation 120 to select one or more additional parts of the content item to sample so long as the user has not exhausted the permitted amount of the sample. In some cases, the user may wish to view one or more different aspects of the content when selecting a different part of the content to sample. Accordingly, the interface 200 may also include the drop-down menu 132 described above to enable the user to select one or more different aspects or features of the content to be displayed in the content representation 120, such as popular highlights, popular annotations, celebrity consumption, trending content, most sampled content and so forth. Alternatively, a plurality of content representations 120 may be displayed in the interface 200, with each content representation 120 including one or more of the different aspects or features of the content. Furthermore, in some instances, one or more of the content representations 120 may be overlaid on or merged with the sampled content representation 212, such as with the sample portions 220 visually distinguished from the other portions of the content representation 120.

The interface 200 may further include an indication to the user of the amount of content that the user has consumed and/or the amount of content that the user has remaining in the allowable free sample. In the illustrated example, the interface includes a first indicator 228 that indicates the amount of sample content that the user has already consumed. For example, the indicator may be expressed in terms of percentage, number of pages, or any other suitable measure of content depending upon the type of content being sampled. Furthermore, the interface 200 may include a second indicator 230 that indicates the amount of sample content that the user may still consume before exhausting the permitted amount of the sample. The second indicator 230 may express an amount of content in manner similar to the first indicator 228 or in any other suitable manner.

A sample management module, as discussed below, may be used by the content provider to keep track of the amount of content delivered to the user device, and may provide consumption information to enable the indicators 228 and/or 230 to provide accurate information. For example, the content provider may provide the information for indicators 228, 230 regarding the amount or percentage of sample content consumed or remaining. Alternatively, the content provider may provide information on ranges, spans or weights of sample content provided, and may further inform the user's device of an allowed amount of content permitted to be sampled. Thus, the user's device may use this information to calculate the amount of sample content received or remaining. As still another alternative, the user's device may receive information as to a permitted amount of sample content and a total amount of content of the content item, and may keep track of how much sample content has been received to provide the indicators 228, 230. When the user has received or finished consuming the entire permitted sample amount, the user may be presented with an invitation to purchase the content item, such as by presentation of the "buy now" control 116 illustrated in FIG. 1. Additionally, the user may be presented with a control similar to the control 146 discussed above to share a sample of the content item 106 with another user.

Additionally, in some cases, the user may have already sampled the permitted amount of content for the particular content item 106, such as in the past. Some implementations herein provide one or more features to prevent a user from sampling more than the permitted amount of content for any particular content item 106. As one example, in order to sample content, the user may first be required to sign in to an authorized user account before being permitted to receive the sample content 204. This can prevent the user from independently obtaining a number of different samples of content and thereby obtaining the entire content item 106 free. Furthermore, the user may be prevented from using multiple different accounts to bypass this security measure such as by requiring the user to provide a credit card or otherwise provide verification for the user's account. Accordingly, in the case that the user accesses the interface 100 of FIG. 1 and attempts to sample content from the content item 106 for which the user has already received the entire permitted amount of a free sample, the user may be presented with the user interface 200 in response to the request, along with the sampled content representation 212 showing the parts of the content item that the user has already sampled in the past. The user may further be provided with a message indicating that the user has previously exhausted the entire amount of the free sample for this content item.

In some examples, when the user attempts to obtain additional sample content, the content provider may offer a pay-as-you-go or pay-per-part access plan to the user. For example, if the user has sampled the permitted amount of content, but is still undecided as to whether to acquire the entire content item 106, some examples may give the user an option to obtain more of the content item by purchasing additional parts of the content item as the parts are consumed. For example, when the content item is a book, the user may be charged on a per chapter basis, per page basis, a per word basis, or the like. Similarly, the user may be charged on a pay per second, pay per minute, pay per frame rate, etc., in the case that the content item is a media or multimedia item.

Additionally, some types of content items may contain a particular part this is of more value than other parts, such as an important figure, image graphic, description, recipe, or the like. Accordingly, there may be some parts of a content item that may be prevented from being provided in a sample, or that may be provided in a redacted (e.g., blacked out, blanked out, etc.) form. Thus, when the user attempts to sample such a part of a content item, the user may be presented with a message that purchase of the content item must be made before the requested part of the content can be made available to the user. Such parts of content may be indicated on the content representation 120, such as by a portion that visually distinguishes the portion in red, or any other suitable fashion, to visually indicate that a particular portion may not be accessed as a sample.

Figure 3:
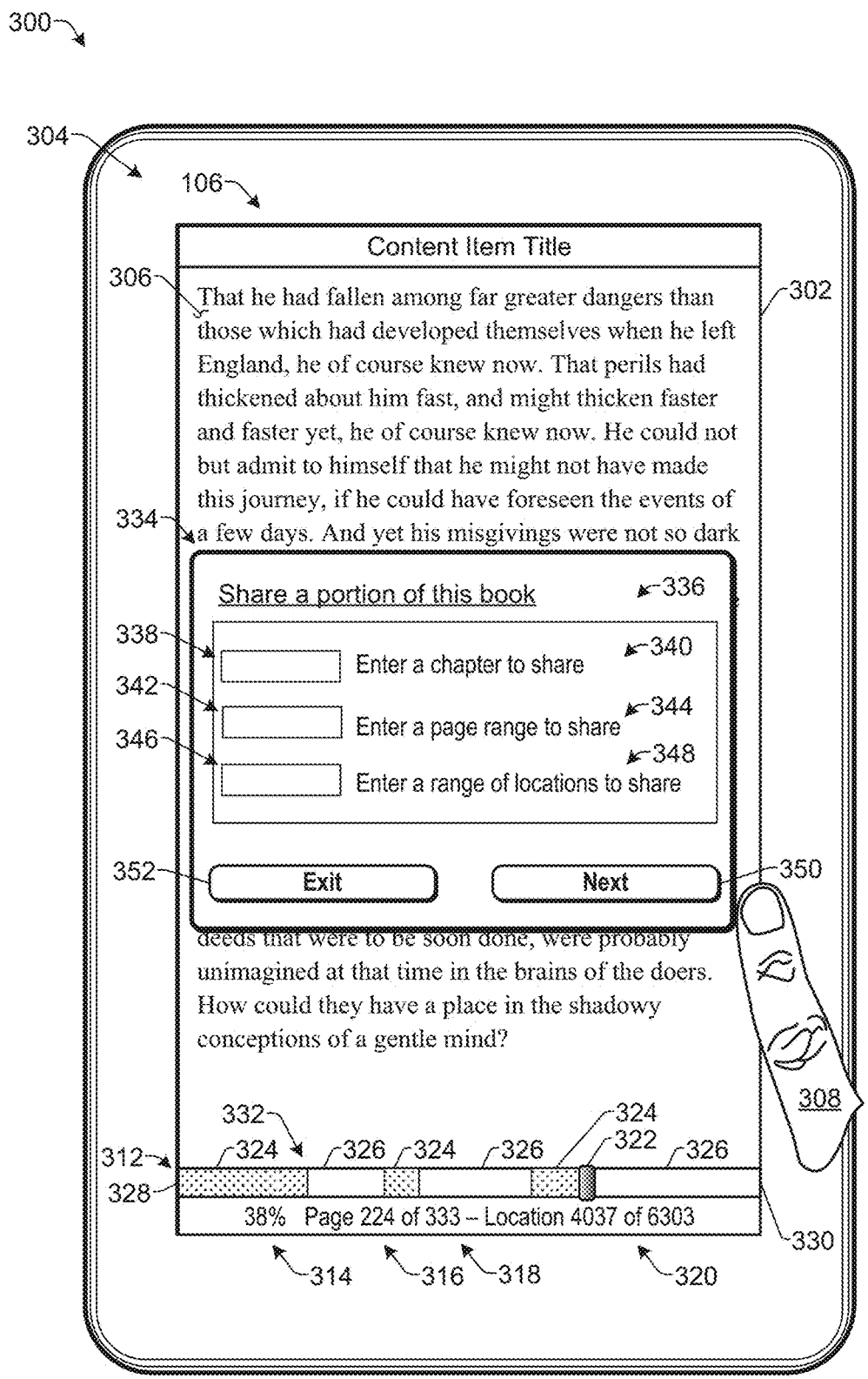
FIG. 3 illustrates an example interface to enable selection of a part of a content item to share according to some implementations.

FIG. 3 illustrates an example electronic device 300 able to present a content item 106, or a sample of a content item, to a user according to some implementations. The electronic device 300 may be implemented as any of a number of different types of electronic devices, as discussed further below. The electronic device 300 may include, or may have associated therewith, a display 302 to present an interface 304 for displaying a content item 106, such as a page 306 of the content item 106 in this example. In some types of electronic devices 300, the display 302 may be a touch-sensitive display configured with a sensor to sense a touch input received from an input effecter 308, such as a finger of a user, a stylus, or the like. Thus, the touch-sensitive display may receive one or more touch inputs, stylus inputs, selections of text, manipulations of displayed controls, and so forth.

In other implementations, the display 302 may be non-touch sensitive. Accordingly, in addition to, or as an alternative to, a touch sensitive display, the electronic device 300 may include various external controls and input devices. For example, some implementations (not shown in FIG. 3) of the electronic device 300 may include a virtual or physical keyboard, a mouse, a pointing stick, a touchpad, a trackball, a joystick, a remote control, buttons and/or various other controls for performing various desired inputs and interactions with the electronic device 300 and the content item 106 presented on the display 302. Additionally, in some implementations, one or more voice commands may be used to control or interact with the content items or interfaces herein. Further, in some examples, a user's eye position, gaze, or point of focus may be detected to serve as inputs or commands. Thus, implementations herein are not limited to any type of input devices, techniques, or controls.

In some cases, the content item 106 may be a book or electronic book (eBook) including text, such as one or more pages 306 of text. For example, the display 302 may present the text of an eBook and any images, illustrations, tables, maps, graphic elements, embedded video, embedded audio, multimedia, three-dimensional content, hyperlinked content, or the like, that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic books, magazines, newspapers, periodicals, journals, reference materials, textbooks, anthologies, instruction manuals, proceedings of meetings, forms, directories, web pages and online documents, emails, plays, screenplays, closed captioning transcripts of movies and television shows, song lyrics, personal documents, word processing documents, portable document format documents, business and office documents, and so forth, as well as other types of content items including text or multimedia that the user may view or interact with using the electronic device 300. Accordingly, a content item 106 may include any readable or viewable textual content that is in electronic or digital form. Additionally, or alternatively, a content item may include other types of media and content, such as video content, audio content, image content, multimedia content, interactive content, game content, Flash® content, 3D graphics content, and the like.

Furthermore, in some examples, a content item 106 may include embedded content, such as video or audio content embedded in an eBook or the like. In such a case, the user may be able to select and sample the embedded content in a manner similar to that discussed above with respect to FIGS. 1 and 2. For example, a location of the embedded content may be indicated on the content representation 120. Additionally, a determination of the amount of content sampled may take into account sampling of the embedded content, and may take into account differently weighted regions of content, which may also be represented in the content representation 120.

In the illustrated example of FIG. 3, during presentation of content of the content item 106, the electronic device 300 may display a consumption representation 312 that represents or indicates which parts of the content item 106 have been accessed, viewed, read, played or otherwise consumed thus far by the user. Additional information may further be displayed with the consumption representation 312, such as a percentage 314 of the content that has been consumed out of the total expanse of content of the content item 106. Other information that may be displayed with the consumption representation 312 may include a current page number 316, of the page 306 of content currently displayed on the display 302, out of a total number of pages 318 in the content item 106. Additionally, or alternatively, the information displayed may include invariant reference location information 320, which may include a current location of the content currently displayed out of the total number of locations in the content item 106. For example, the content provider may use invariant referencing to assign location numbers to parts of the content item 106. The location numbers may remain constant for the parts of the content item regardless of a screen size, font type, font size or other variations in the display conditions of the content item 106.

Furthermore, in some examples, the consumption representation 312 may include a control or handle 322 that is positioned on the consumption representation 312 at a location that corresponds to a location in the content item of the currently displayed page 306. In the illustrated example, the currently displayed content is page 224 of 333 pages, e.g., about 67% of the way through the content item 106. Thus, the handle 322 is positioned at a location that is advanced approximately 67% along the total length of the consumption representation 312. The user may slide the handle 322 along the consumption representation 312 to access and display different parts of the content item 106. For example, if the user touches the handle 322 with a finger 308, and slides the handle 322 back to the middle of the consumption representation 312, the electronic device 300 may display a page of content that is halfway through the content item 106, e.g., page 167.

The consumption representation 312 may include at least one portion that is visually distinguished from another portion to indicate a location in the content item 106 of content that has been consumed by the user. In the illustrated example, the consumption representation 312 includes a first plurality of portions 324 that are visually distinguished from a second plurality of portions 326. For example, the first plurality of portions 324 may represent parts or locations in the content item 106 that have been consumed by the user, while the second plurality of portions 326 may represent parts or locations in the content item that have not yet been consumed by the user. The first portions 324 may be visually distinguished from the second portions 326 using any suitable graphics schemes or techniques, such as by using different colors, different shades, different backgrounds or fill patterns, cross-hatching, outlining, inserting or removing graphical elements, and so forth, as may also be the case with the content representations 120 and 212 discussed above with respect to FIGS. 1 and 2, respectively. Accordingly, implementations herein are not limited to any techniques for visually distinguishing one portion of the consumption representations from another.

The consumption representation 312 includes a first side 328 that may be representative of a beginning of the content of the content item 106, and a second side 330 that may be representative of an end of the content of the content item. Thus, the consumption representation 312 includes an area 332 that is representative of a length of content of the content item. The area 332 is a rectangular bar in this example, but is not limited to any particular shape or configuration.

In some examples, the area 332 may represent the total amount of content contained in a content item 106. In other examples, the length of content represented by the area 332 may be less than the total amount of content of the content item. For example, the consumption representation 312 may represent a chapter or other part of content of the content item 106. Likewise, in other examples, the consumption representation 312 may represent more than the total amount of content of the content item, 106 such as in the case where the consumption representation 312 represents a series of multiple books.

The one or more portions 324 of the content representation 312 that correspond to content that has been consumed by the user may be identified using various techniques for determining that the user has most likely read or otherwise consumed the particular part of content. As one example, an amount of time that a user spends on a particular page or part of the content may be used as a measure for determining whether the user has consumed the particular part of content. In some examples, if the user spends more than a threshold amount of time having a particular page displayed, the electronic device 300 may classify that page as having been read or otherwise consumed.

Additionally, in some examples, the threshold amount of time may vary based on the amount of content contained on the particular page. For instance, if there is a large amount of text on a page, the time spent on the page may be compared with a first threshold determined based on the amount of text, whereas if there is a small amount of text, a simple image, or the like, a different, shorter, time threshold may be applied. Accordingly, the amount of time that a particular page or other part of content is presented may be compared with a threshold time limit for determining whether the user has read or otherwise consumed the particular page or part of content.

In addition, in some implementations, the threshold times may be adjusted based on a detected consumption rate of a particular user. For example, if data collected over time indicates that a particular user's reading speed for one or more other books is substantially faster or slower than the reading pace of the average reader for those books, then the threshold times for determining that the particular user has read a particular page may be adjusted based on the estimated reading speed of the user.

As another example, gaze tracking may be used for determining whether a user has completed reading a page. For instance, the electronic device 300 may include one or more cameras or other sensors (not shown in FIG. 3) for tracking a gaze of a user to determine whether the user has read a particular page. Gaze tracking may determine when the user starts reading text at a beginning of the page, and may determine that the user has traversed the text on the page to the end of the page. Similarly, for video content, the gaze tracking may determine whether the user is actually looking at the video while the video content is being displayed.

In the case that the content item 106 is a book or similar textual or paginated content item, as a user consumes consecutive pages of the content item, the electronic device may keep track of each page consumed and establish a range of pages that have been consumed from a page at the beginning of the range to a page at the end of the range. For instance, a range may be created from a plurality of consecutive forward page turns. Additionally, one or more additional ranges may be created for backward page turns or following jumps from one part of the content to another that skip at least one page. Pages that the user passes by too quickly to read, e.g., by not meeting a minimum time threshold based on the amount of content on the page, may not be classified as having been consumed.

Furthermore, in the case of media content, such as audio and/or video content, as the user begins to consume a part of content, a current range may be established that grows as the content is played. As one example, the range may be based on an elapsed playtime at the start of the range to a remaining playtime at the end of the range. When the user pauses playing a part of content, or skips to another part of content, the current range may be saved and classified as consumed, and a new range may be started when the user starts to play another part of the content. In addition, the consumption representation 312 may be updated in real time to show the current location of the user in the content item and the current consumption status of the content item.

As another example, for scrollable media, such as electronic documents or webpages, a similar consumption representation may be provided with the consumption ranges arranged vertically along a scrollbar. For instance, a scrollbar handle may essentially function similarly to a digital paintbrush that adds a different color, shading or pattern to a background of the scrollbar or an adjacent consumption representation. A longer amount of time spent at a particular location in the scrollable media may result in more color, more shading, more patterning, or a darker color being added at that location in the consumption representation. Repeated visits to a particular location in the scrollable media may also add more color, shading, patterning, or other graphic effects.

In addition, for hybrid or hyperlinked media, such as webpages having embedded content, eBooks or documents having embedded content, and the like, some implementations herein may generate a consumption representation to inform a user as to whether one or more parts of the embedded content have already been viewed or otherwise consumed by the user. As one example, suppose that an eBook has a video embedded in a page of the book. Progress of the user in viewing the video may be added to the consumption representation of the eBook at a location corresponding to the location of the video display interface within the eBook. For instance, particular icons or other indicators may be provided in the overall consumption representation for the eBook that indicate a percentage of the user's progress in viewing the video.

As another example, an audio recording may be embedded in a webpage and consumption of the recording may be logged when the user accesses the audio recording. Subsequently, if the user visits another webpage that includes the same audio recording, a consumption representation may be displayed in association with the webpage to indicate that the user has already consumed the particular audio recording. For example, the consumption representation may be overlaid on a display of the webpage to indicate an entire amount of content of the webpage including multimedia content and any progress of the user in consuming any of the content of the webpage. Numerous other variations and examples will be apparent to those of skill in the art having the benefit of the disclosure herein.

In some cases, a user may have multiple devices associated with a user account, each of which may be authorized to display a particular content item. Consumption information for an instance of a particular content item on a first user device may be synchronized or merged with consumption information for another instance of the same content item on one or more of the user's other devices. In some examples, the consumption representation 312 may be synchronized with other devices of a user by sending, to a content provider, location information, logs, or other records of parts of the content item 106 that have been classified as consumed. For example, the consumption information may be sent to a content provider, exclusive of the content item or the consumed content. The content provider may then synchronize this information with other devices associated with the user, such a through a common user account. As another example, a bit map representation of a consumption representation 312 may be sent to the content provider, rather than log information or location information. In some examples, when the user accesses an instance of the content item on the one or more other devices, the consumption information synchronized to that device may be used to present the other instance of the content item with the same consumption information as displayed as on the first user device.

Additionally, in some examples, as discussed below, consumption information obtained from a plurality of users may be aggregated and merged, combined, or the like, to determine parts of the content that are popularly or more frequently consumed by users who have accessed a particular content item 106. The content provider may then use this aggregated information to generate the aggregated consumption information for the content representation 120 discussed above with reference to FIGS. 1-2.

FIG. 3 further illustrates an example user interface 334 that may be displayed on the display 302, such as when the user desires to share a part of a content item 106 with another user, or post a link to the part of the content item to a website, or the like. For example, suppose that the user has finished reading a part of the content item corresponding to pages 219-225 of the content item 106, and desires to share this part of content with another user, such as a friend, coworker, fellow organization member, etc. The user may activate the interface 334 to initiate a process for sharing the part of content with at least one user, or for posting a link to the part of content to a social network site, a microblog site, a wiki site, or the like.

The interface 334 may include one or more options 336 for selecting a part of the content item 106 to share. For example, enter chapter information into a text entry box 338 for sharing a chapter of the book as indicated at 340. Alternatively, the user may enter the page range into a text entry box 342 to share a range of pages, as indicated at 344. As another alternative, the user may enter a range of locations into a text entry box 346 to share a range of locations, as indicated at 348. As still another alternative, the user may tap on a visually distinguished portion 324 of the content representation 312 to share the range of content represented by the visually distinguished portion 324. As still another alternative, the user may use the handle 322 to select a part of content to share. As still another alternative, the user may highlight text of the displayed content item to select a part of content to share. Other variations will be apparent to those of skill in the art in view of the disclosure herein.

When the user has selected a desired part of content to share the device may determine whether the content is within the permissible range of content that may be sampled by another user such as 5%, 10% or some other permissible sample amount. If the selected content is larger than the amount permitted to be sampled, the user may be encouraged to select a smaller range of content to share before proceeding. For example, the interface 334 may notify the user when the user is trying to share a range or part of the content that is too large (e.g., a range that can only be shared in its entirety with people who already own the content item). Additionally, the user may be notified if some of the selected range is "unsampleable" (e.g., certain parts that are not permitted to be shared or sampled, such as due to publisher or author restrictions, as mentioned above in the case of certain content that is of particular value). In some examples, weights may be assigned to various regions and may be color coded, or the like. As the user selects a range to share, the user may be able to see that the requirements for sharing certain regions may be different. For example, the user may access the content representation 120 discussed above to select a portion to share, and as the user drags a range selector (e.g., handle, cursor, finger, etc.) over the content representation 120, the user may be presented with an indication of which portions of content may be shared with a friend. Alternatively, if the selected content part is within the amount permitted for sampling, the user may be permitted to proceed by selecting a "next" button 350. If the user decides to not share a part of content after all, the user may select an "exit" button 352 and return to viewing the content item 306.

Figure 4:
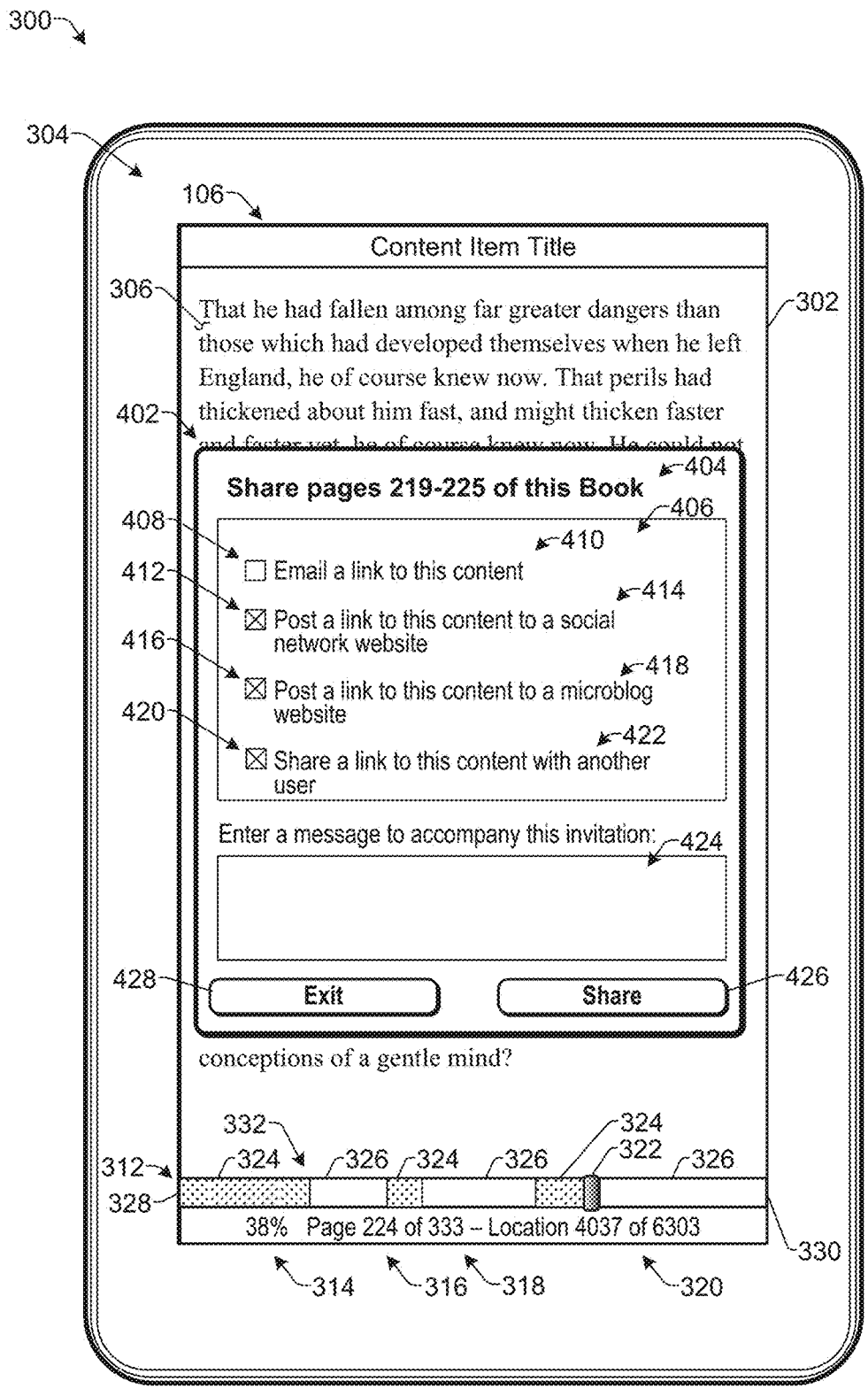
FIG. 4 illustrates an example interface to enable sharing of a part of a content item according to some implementations.

FIG. 4 illustrates an example interface 402 that may be displayed on the device 300 to enable sharing a part of a content item according to some implementations herein. Following a selection of the desired part of content to be shared, as described above with respect to FIG. 3, the interface 402 may identify the part of content selected to be shared at 404, and present one or more options 406 for sharing the selected part of content. As several examples, the user may select a box 408 to email a link to the content to another user, as indicated at 410; the user may select a box 412 to post a link to the content to a social network website, as indicated at 414; the user may select a box 416 to post a link to the content to a microblog website, as indicated at 418; and/or the user may select a block 420 to share a link to the content with another user that can be identified to the content provider, as indicated at 422. For example, the other user may have an account with the content provider and, thus, the content provider may have contact information for sending a link to the shared content directly to a device of the other user. As still another examples (not shown in FIG. 4), the first user may elect to send the link to the shared content as an SMS text message, and instant messaging service message, or by any other suitable electronic communications techniques. As still another example, the user may elect to share the link manually, such as by having the content provider send the link to the user and the user then sending the link to another user, or posting the link to a website. As still another example, the link may be sent to a first site that is not directly designed for sharing, but which may be used indirectly for that purpose, such as a bookmark synchronizing service, or the like, which may subsequently allow sharing to other sites, such as social network sites, microblog sites, etc.

The user may further be provided the opportunity to enter a message into a text entry box 424 to accompany the shared content. For example, the user may type a suitable text message into the box 422, depending on the intended destination of the invitation to share the part of the content item. When the user has finished making the selection(s) and/or adding a text message, the user may share the selected content by selecting a "share" button 426. Alternatively, if the user decides not to share the content, the user may select an "exit" button 428 to close the interface 402 and return to viewing the content item 106.

Upon selecting the share button 426, a request may be sent from the user's device to the content provider. The request may identify the content item 106 and the part of the content item selected by the user to be shared. The request may further include the text message entered by the user, if any, and selection information regarding where a link to the content should be sent by the content provider. For example, if the first user selects the option to email a link to the shared content to a second user, then prior to sending the request, the first user may be presented with an additional interface to select or enter the email address of the second user to which the link for the shared content will be sent. Accordingly, this email address of the second user may accompany the request to the content provider, and the content provider may compose an email message on behalf of the first user to the designated email address of the second user. In the email to the second user, the content provider may insert the text message provided by the first user and a link to a location on the content provider's site at which the second user may access the shared content. For example, the link may be a uniform resource locator (URL) or other network location identifier that the second user may select to cause a browser or other application to access an interface on the content provider's site to obtain the shared sample content, similar to the interfaces of FIG. 1 and/or FIG. 2. The content provider may store the sharing request information, and associate the link with the storage location so that when the second user selects the link, the information regarding the shared part of content (e.g., at least an identifier of the content item and the shared page numbers) may be accessed and used to indicate a sample of the content item to be provided to the second user. In some examples, the sharing request may merely identify the content item to be shared. For instance, a title and author, an ASIN (Amazon Standard Identification Number), an ISBN (International Standard Book Number) or other identifier may be used to identify a content item. Thus, a user interested in the content item may access the content provider site to select a sample, as discussed above with respect to FIGS. 1-2.

Alternatively, if the first user elects to post the link to the shared content to a social network site or a microblog site, as indicated at 414 or 418, respectively, the information for the first user's accounts at those sites may have already been provided to the content provider or may be included with the request, and the content provider may post the link to the shared content at the designated site on behalf of the user, such as through direct access, an in-site application or an API (application programming interface). Additionally, in the case that the first user identifies a second user that has an account with the content provider, the content provider may send the text message and a link to the shared content directly to a device of the second user. For example, an email address or other identifier of the second user may be provided by the first user, and the content provider may be able to identify the account of the second user through association with the email address or identifier of the second user. Numerous other suitable techniques may be employed for identifying the contact information of the second user.

Figure 5:
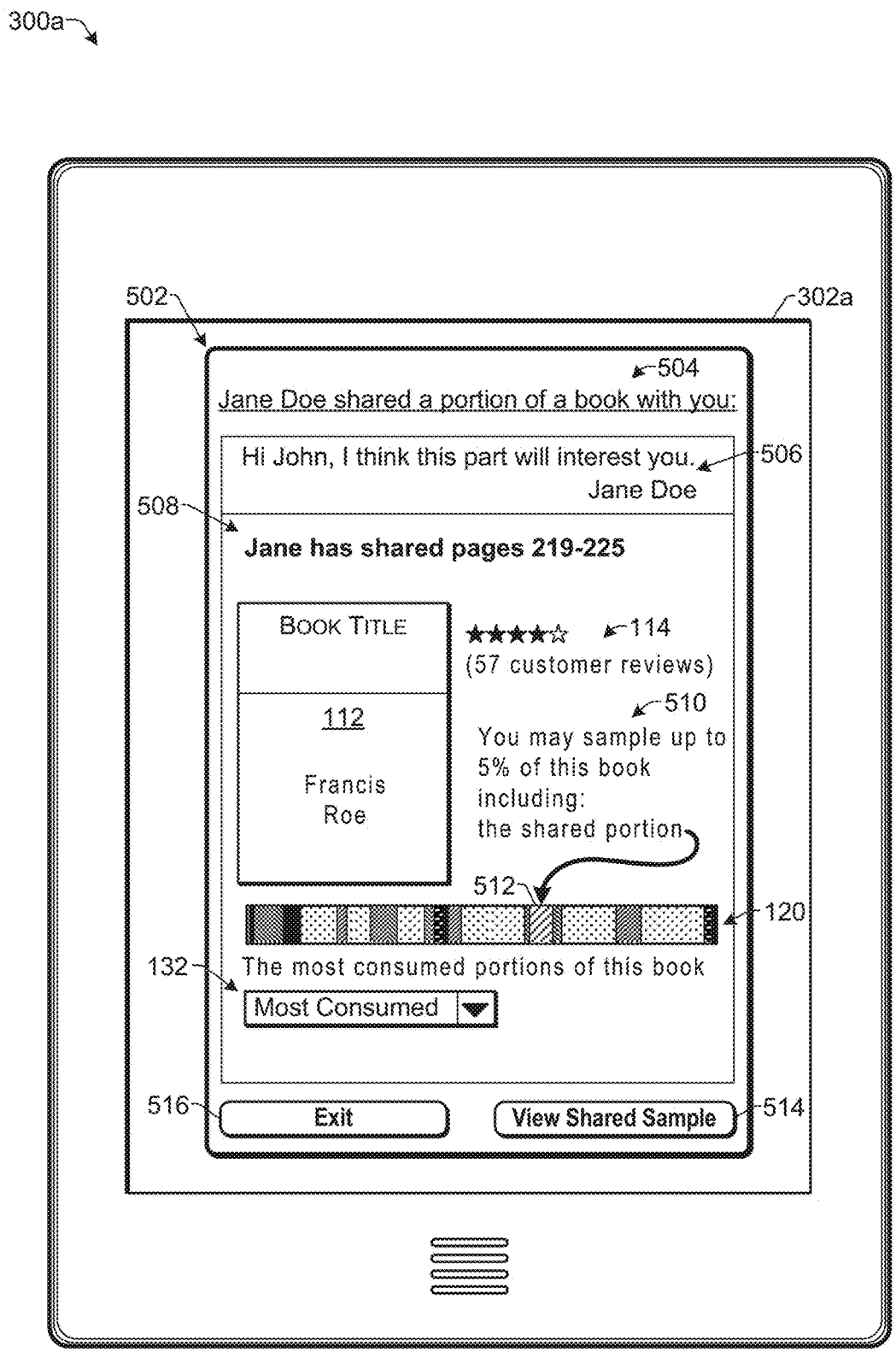
FIG. 5 illustrates an example interface to enable access to a shared part of a content item according to some implementations.

FIG. 5 illustrates an example electronic device 300a that may receive an invitation to access shared content according to some implementations herein. The device 300a may be the same type of device as the device 300, or may be any of a number of other types of devices, as enumerated below. In this example, the device 300a may be associated with the second user and may include a display 302a. The display 302a may present an interface 502 to inform the second user of the link to the shared content provided on behalf of the first user. For example, the interface 502 may be presented to the second user when the second user turns on the device 300a, accesses a content presentation module or application on the device 300a, accesses email on the device 300a, or the like. In some instances, the interface 502 may be a pop-up interface, may be overlaid on top of a content item presentation, or may be any other suitable type of interface or messaging functionality, as discussed additionally below.

The interface 502 may include a message from the content provider such as "Jane Doe shared a portion of a book with you," or other suitable message to inform the second user of the purpose of the interface 502. Furthermore, the interface 502 may include the text message from the first user if any as indicated at 506. The interface 502 may also identify the shared part of the content item as indicated at 508. Additionally, the interface 502 may include other information about the shared content item, such as described above with reference to FIG. 1, including the book cover 112, which may identify the title and author, a summary and link to customer reviews 114, the content representation 120 that may indicate the most read parts of the content item, and the drop-down menu 132 for selecting other aspects or features of the content to display in the content representation 120.

The interface 502 may further include a message 510 informing the second user that the second user may sample up to a predetermined amount of the content item, which may include the shared part. The interface 502 may further identify the location of the shared part in the content representation as indicated at 512. Accordingly, the second user may view the shared sample by selecting a view shared sample button or control 514. Alternatively, the second user may exit without viewing the shared sample by selecting an exit button or control 516. Furthermore, in some examples, the second user may select a different portion of the content item for sampling. For example, the second user may select a part of content by tapping on the content representation 120 in the same manner as discussed above with respect to FIGS. 1 and 2. Furthermore, the second user may use the drop-down menu 132 to select a different aspect of the content to be displayed in the content representation 120 prior to selecting a different part of the content item 106 to be sampled.

When the second user elects to view the shared sample, such as by selecting the "view shared sample" button 514, or elects to sample a different part the book by selecting a portion from the content representation 120 or by other suitable selection technique, the second user may be presented with an interface similar to that described with reference to FIG. 2. Additionally, as described above, if the second user has already sampled the permissible amount of the particular content item, the second user may be presented with a message to the effect that no further samples are permitted, as discussed above with respect to FIG. 2. In addition, if a user were to follow a link made available through the other techniques discussed, such selecting a link posted to a social network site or a microblog site, that user may be presented with an interface similar to interface 502 discussed above, but with some possible modifications based on the type of device, the type of application being used, and so forth.

As another example, rather than having a first user select a portion of the content item to share, the content provider, an advertiser, or other entity, may post a link to website, a social network page, or a microblog site. For example, suppose that a celebrity has agreed to have her or his consumption progress tracked with respect to a particular content item 106. The content provider may post an advertisement to a fan website for the celebrity, a social network page of the celebrity, may post through a microblog account of the celebrity, or the like. The advertisement may include a link to a network location, which when selected by a user may present an interface, such as that shown in FIG. 1 or FIG. 5, with the content representation 120 configured to show the consumption information for the celebrity. Thus, the content representation may indicate a particular page that the celebrity is currently reading, which parts of the content item 106 the celebrity has read most, and so forth. Accordingly, a user may select a sample to view the parts of the content that the celebrity is currently reading, has read most, or the like. Numerous other variations will be apparent to those of skill in the art in light of the disclosure herein. Consequently, implementations herein enable sampling of a content item and/or sharing a sample part of a content item among multiple users without limiting the users to a predetermined or linear sample, such as the first chapter of a content item.

Figure 6:
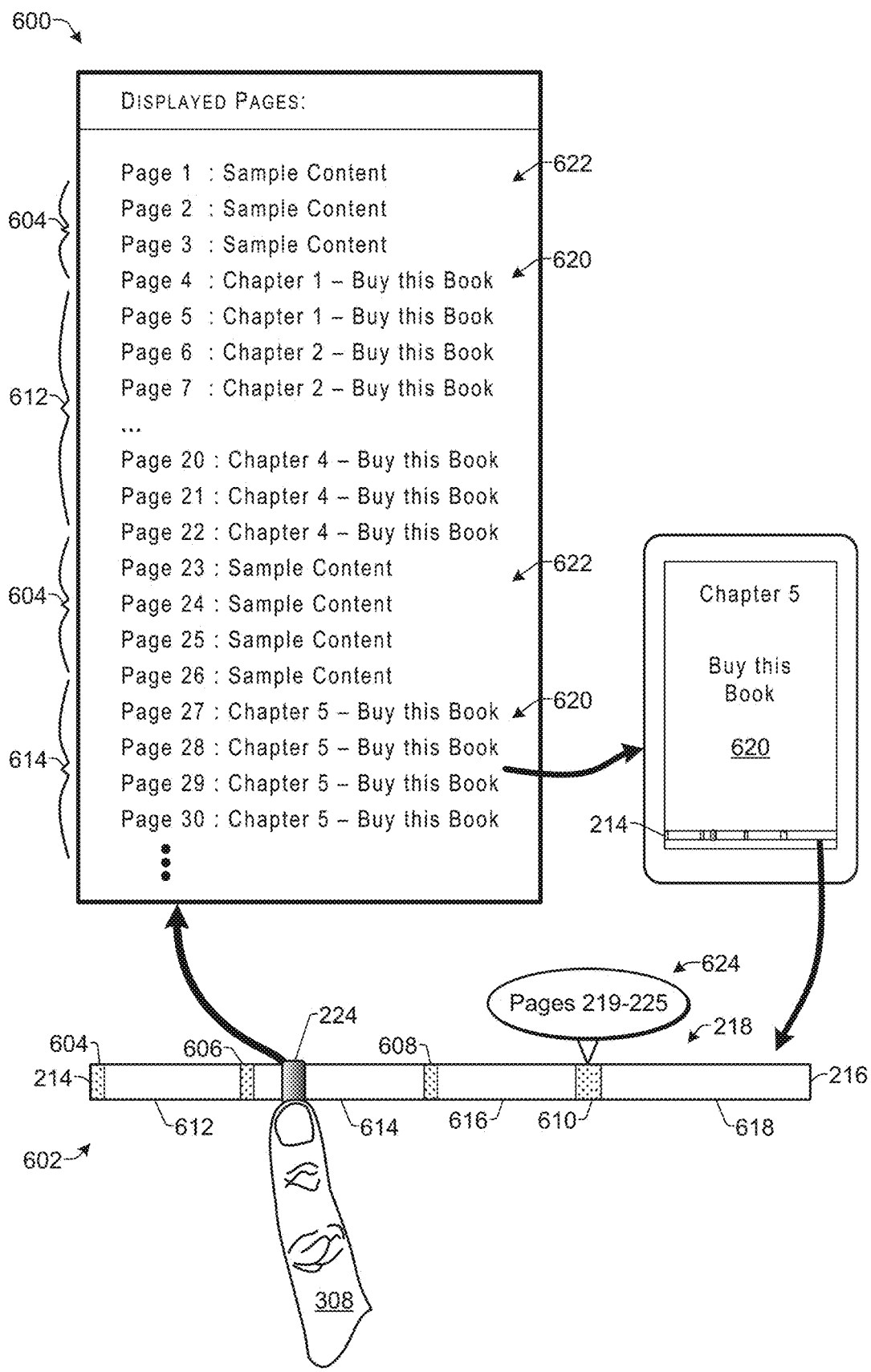
FIG. 6 illustrates an example of presenting sample content according to some implementations.

FIG. 6 illustrates an example framework 600 for presenting sample content to a user on an electronic device according to some implementations. In this example, suppose the user has accessed sample content for a content item 106, as discussed above with respect to FIG. 2. Accessing (e.g., streaming) the sample content may result in the sampled content representation 602 illustrated in FIG. 6. For example, the user may sample a first sample part of the content item corresponding to a first visually distinguished portion 604 of the content representation 602; a second sample part of the content item corresponding to a second visually distinguished portion 606; a third sample part of the content item corresponding to a third visually distinguished portion 608; and a fourth sample part of the content item corresponding to a fourth visually distinguished portion 610. The first visually distinguished portion 604 and the second visually distinguished portion 606 are separated by a first area 612 corresponding to a first non-sampled part of the content; the second visually distinguished portion 606 and the third visually distinguished portion 608 are separated by a second area 614 corresponding to a second non-sampled part of the content; the third visually distinguished portion 608 and the fourth visually distinguished portion 610 are separated by a third area 616 corresponding to a third non-sampled part of the content; and following the fourth visually distinguished portion 610 is a fourth area 618 corresponding to a fourth non-sampled part of the content.

As the user traverses from one part of the sample content to the next, implementations herein may display one or more filler pages 620 between the sample content 622 to give the user a feel for the amount of content in the content item 106. In some examples, the filler pages 620 may not appear until after all the sample content 622 has been received. However, in other examples, the filler pages may be presented as the user initially traverses the sample content. In addition, rather than being merely blank pages, the filler pages 620 may include some information that provides the user with an indication of a current location in the content item, such as a chapter number or heading, page number, or the like. For example, if the user is currently traversing the area 614 between the second visually distinguished portion 606 and the third visually distinguished portion 608, a number of filler pages 620 may be added to the content presented to the user while traversing in the area 614. The number of filler pages may be the same as in the actual content, may be more than in the actual content, or may be less than in the actual content. For example, the user may use the handle 224 to traverse from one sample part to the next, such as by dragging the handle 224 along the content representation 602. Accordingly, the user may be presented with one or more filler pages 620 while traversing the area 614. In the illustrated example, each filler page 620 may include a chapter heading corresponding to the chapter in the content item at that location, which in this particular example would be chapter 5. In some examples, the remainder of the filler page 620 may be blank. However, in other examples, the filler pages 620 may include an additional message or link, such as for urging the user to buy the content item, or the like. Additionally, filler frames may be used in a similar manner to the filler pages described above in the case that the content item includes video content.

Consequently, as the user traverses through the sample parts of the content item, the filler pages 620 give the user an indication of the overall size and content of the content item 106. Furthermore, in some examples, a "page-turning" graphic effect may be provided to further enhance the user experience of paging through a book. For example, as a user moves the handle 224 through the non-sampled portions, the pages may graphically appear to quickly turn or flip from one page to the next.

Additionally, as also illustrated in FIG. 6, in some examples the user may select one of the visually distinguished portions of the content representation, such as the fourth visually distinguished portion 610. For example, the user may tap or click on the visually distinguished portion 610, or otherwise make a selection of the visually distinguished portion 610. This may result in the display of an indicator 624 of the part of content to which the visually distinguished portion 610 corresponds. In this example, the selected visually distinguished portion 610 corresponds to pages 219-225 of the content item. Accordingly, the user may quickly determine which parts of the content item have been sampled using this technique. A similar technique may be applied to the content representation 120 discussed above, such as when selecting a part of content to sample.

Figure 7:
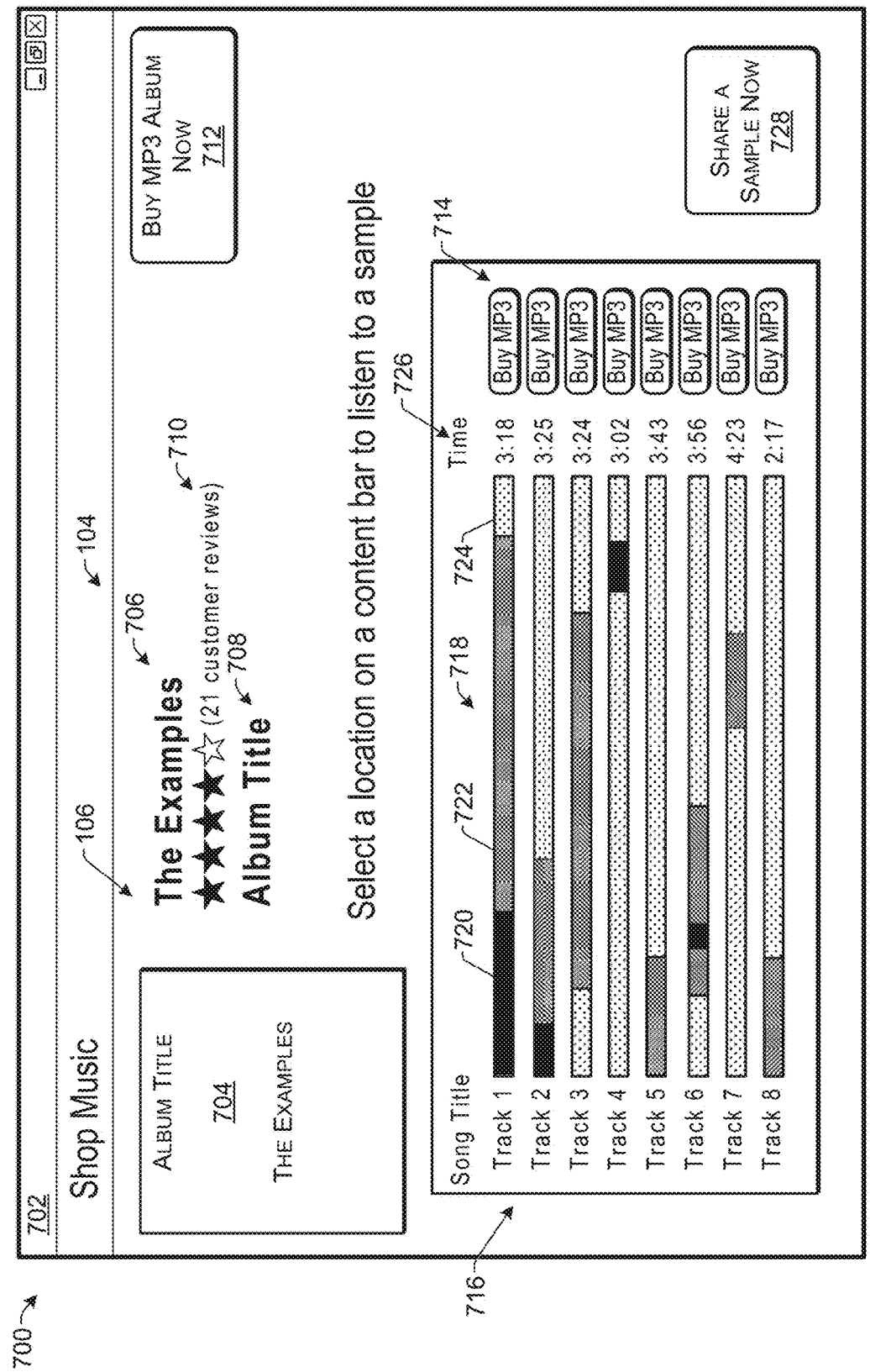
FIG. 7 illustrates an example interface to enable sampling of one or more parts of a content item according to some implementations.

FIG. 7 illustrates an example interface 700 that may be presented to a user for playing to samples of a media item, such as a music album, movie, television show, video recording, audio recording, or the like, according to some implementations. Similar to the example of FIG. 1 described above, the interface 700 may be presented in a window 702 and may include an offer 704 of a content item 106, which in this example is a music album. The offer 104 may include an image 704 of the album cover, the name of the artist 706, the album title 708, and a summary and link to customer reviews 710. The interface 700 may further include a selectable control 712 to buy the entire music album, and a plurality of selectable controls 714 to buy individual songs or tracks 716 of the album.

Similar to the example discussed above with respect to FIG. 1, a plurality of content representations 718 may be presented in the interface 700 e.g., one content representation 718 corresponding to each track 716 in the content item 106. Accordingly, a user may select a part to sample for a particular track 716, such as by selecting a start point at any location along a length of the content representation 718 for a particular track. Thus, a user may be able to select at least a start location for the sample from among multiple available start locations within the content of the content item. Furthermore, each content representation 718 may include an indication of popular or most-listened to portions of the corresponding track 716. For example, a first visually distinguished portion 720 may represent a most popular, first degree of popularity for the part of content corresponding to that portion; a second visually distinguished portion 722 may represent a mid-range popular, second degree of popularity for the part of content corresponding to that portion, and a third visually distinguished portion 724 may represent a least popular, third degree of popularity for the part of content corresponding to that portion. Further, while three levels of granularity are shown in this example many levels may be used in other examples similar to a heat map or the like.

Aggregated user information to support the popularity information displayed in the content representation 718 may be obtained in a similar manner to that discussed above with respect to FIG. 3. For example, with user permission, the information regarding playtime may be transmitted to the content provider for aggregation and determination of the most popular parts of each song track 716.

As mentioned above, a user may sample a predetermined amount of a particular track 716 such as by selecting a starting point anywhere along the content representation 718 for that track. As one example, a consumer may sample multiple noncontiguous parts of the track 718, such as by starting playback at a first location, stopping playback, and then starting playback at a second noncontiguous location until the user's allocation of free sample content is exhausted. As one example, a playtime 726 may be associated with each track 716 and the user may be allocated a percentage of that time such as 5%, 10%, or the like. As another example, the user may be allocated specified amount of time amount for each track, such as 30 seconds, 45 seconds, or the like.

In some examples, the user may be presented with an interface similar to that discussed above with respect to FIG. 2 during sampling of a particular track. The content provider may monitor the amount of content provided to the user, such as by tracking the pieces of the content streamed to the user in response to the sample requests. In some cases, the content provider may maintain a log file that tracks locations that have been provided to the user out of a total expanse of the content item. Alternatively, the content provider may maintain a bitmap, with one bit corresponding to one second of playtime for the content item. The bitmap may be updated as each piece of content is streamed to the user until the user has reached the permitted sampling limit. Other techniques for tracking user sampling may also be used, with the foregoing being merely several possible examples.

When the user has reached the limit to the amount of the sample permitted for the particular track, the user may be presented with a message to that effect. The user may then return to the interface 700 for selecting another track to sample and/or to make a purchase. Other variations will also be apparent to those of skill in the art in light of the disclosure herein. Furthermore, by selection of a sharing control 728, the user may be able to share a selected sample of a track 716 with another user in a manner similar to that discussed above with respect to FIGS. 1 and 4-6. Consequently, while several examples have been provided herein for discussion purposes, implementations herein are not limited to the particular examples provided and discussed, but may be extended to other types of content items, other sharing techniques, other sampling techniques, other types of content representations, graphics effects and schemes, other types of user interfaces, and the like, as will be apparent to those of skill in the art in light of the disclosure herein.

Example Architecture

Figure 8:
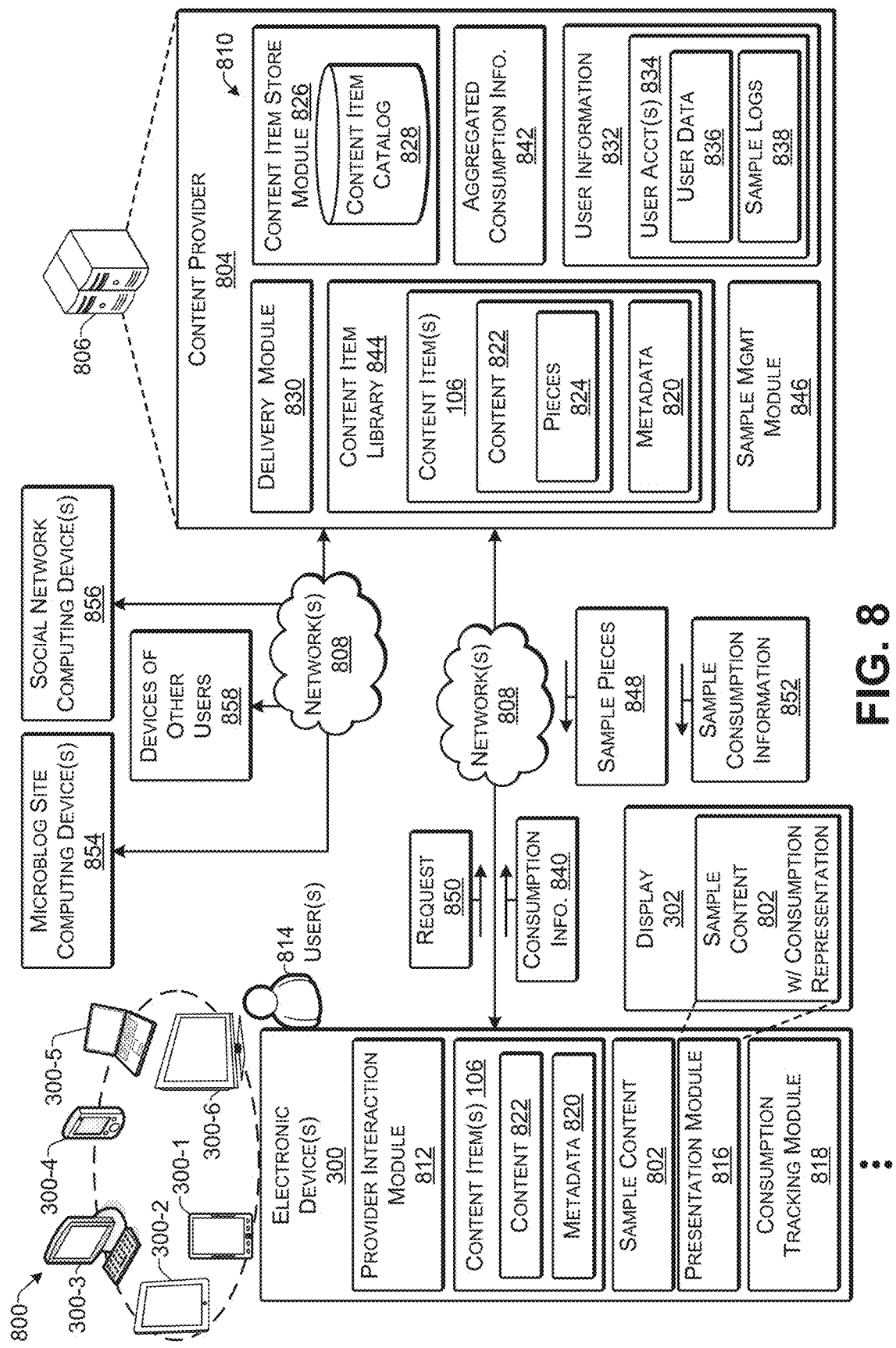
FIG. 8 illustrates an example system architecture to enable sampling of a content item according to some implementations herein

FIG. 8 illustrates an example architecture of a system 800 to enable sampling of content and/or sharing of samples of content according to some implementations. In some examples, sample content 802 with a consumption representation may be presented by one or more electronic devices 300 capable of displaying, rendering or otherwise presenting the sample content 802, such as on an associated display 302. Some examples of the electronic device(s) 300 may include digital media devices and eBook readers 300-1; tablet computing devices 300-2; desktop, terminal and workstation computing devices 300-3; smart phones and mobile devices 300-4; laptop and netbook computing devices 300-5; televisions, gaming systems, and home and automotive electronic devices 300-6; and any other device capable of accessing and rendering or playing content items, online content, mobile content, textual content, multimedia content, or the like.

In the illustrated example, the electronic device 300 is able to communicate with a content provider 804. For instance, the electronic device 300 may communicate with one or more computing devices 806 of the content provider 804, to access or receive at least one content item 106 over one or more networks 808. For example, the network(s) 808 may include a local area network (LAN), a wide area network (WAN), such as the Internet, or any combination thereof, and may include both wired and wireless communication technologies using any suitable protocols and communication techniques. The computing device 806 of the content provider and the electronic device 300 may communicate and interact with one another using any combination of suitable communication and networking protocols, such as Internet protocol (IP), transmission control protocol (TCP), hypertext transfer protocol (HTTP), and so forth. In some cases, the electronic device 300 may download one or more content items 106 and/or sample content 802, while in other cases the content items 106 and/or sample content 802 may be streamed to the electronic device 300.

The content provider 804 may maintain an online location or site 810, such as a merchant website, an e-commerce site, or other functionality that offers one or more content items 106 to the public. For example, the content provider site 810 may be hosted on one or more of the computing devices 806. In some cases, the host computing devices 806 may be one or more web servers located at a data center, server farm, or other single physical location. In other cases, the content provider site 810 or portions thereof may be located in diverse locations that are physically remote from one another. Further, in some implementations, the content provider site 810 may be a group of websites, data stores, services, and the like, hosted on a plurality of different host computing devices 806 in a plurality of diverse locations, or hosted by one or more host computing devices 806 at a single location.

In some implementations, the content provider site 810 may offer content items 106 to the public through an online presence accessible by a web browser or other application. In some examples, the content provider site 810 alternatively, or additionally, may provide content items 106 through an online or mobile application executing on the electronic device 300. For example, an application on the electronic device 300 may connect to or obtain content from the content provider site 810 to enable the purchase or management of one or more content items 106, accessing a sample of one or more content items, and the like. Thus, the content provider site 810 may enable the electronic device 300 to access content items 106 and/or samples through an online or mobile application executing on a mobile device as the electronic device 300, such as an eBook reader, smart phone, tablet computing device, augmented reality device, or the like. Accordingly, the content provider site 810 is not limited to a website accessed by a browser, but may encompass other technologies for marketing and providing content items 106 and samples, such as through in-application shopping, and the like.

The electronic device 300 may include a provider interaction module 812, which in some instances may be an application, such as a web browser, mobile application, or other module or computer program configured to receive web content, webviews, online content, or the like, for accessing and interacting with one or more modules of the content provider 804. For example, the provider interaction module 812 may enable a user 814 to shop for content items at the content provider site 810 and access or receive content items 106 or sample content 802 from the content provider site 810, such as by downloading through the network 808. Further, in some implementations, the provider interaction module 812 may enable the user 814 to organize or manage the content items 106 on the electronic device 300, while in other implementations a separate management module (not shown) may provide this functionality.

The electronic device 300 may include a content item presentation module 816, a consumption tracking module 818, and may further include one or more content items 106. In some implementations, the presentation module 816, the consumption tracking module 818, and the provider interaction module 812 may be separate modules or applications. In other implementations, the presentation module 816, the consumption tracking module 818, and the provider interaction module 812 may both be part of the same application or computer program for accessing and presenting content on the electronic device 300. In yet other implementations, the presentation module 816, the consumption tracking module 818, and the provider interaction module 812 may represent different functionalities of the same module.

As one example, the presentation module 816 may present sample content 802 and/or content of a content item 106 on the display 302. In some examples, the display 302 may be part of the electronic device 300, and/or unitary with the electronic device 300. In other examples, the display 302 may be separate from the electronic device 300 and connected to or coupled with the electronic device 300. In any case, the presentation module 816 may render sample content 802 on the display 302 for viewing by the user 814. The presentation module 816 may further display the sample content 802 with a sampled content representation 212, or the like, as described above with respect to FIG. 2. For example, the sample content 802 may be received as streaming data and displayed by the presentation module 816. The presentation module 816 may further generate the sampled content representation 212 corresponding to the presented sample content 802, as well as indicators 228, 230 of an amount of sample content received and/or remaining. Alternatively, in other examples, the provider interaction module 812 may perform these functions, such as in a browser window.

In addition, the electronic device 300 may include the consumption tracking module 818 that may be executed to track the consumption of a user with respect to each content item 106. For example, with respect to paginated content, the consumption tracking module 818 may determine an amount of time that a user spends on each page of content, and may compare that amount of time with a timing threshold for determining whether the user has consumed the page of content. As discussed above, the timing threshold may be based at least in part on an amount of content contained on a particular page of the content item that the user is currently viewing. For example, a page with a small amount text or a simple image may be consumed in substantially less time than a page with a large amount of text or complex images. Similarly, with respect to multimedia content, the consumption tracking module 818 may assume that the content has been consumed when the multimedia content is played at normal speed. Additionally, in the case of high-speed scrubbing, the consumption tracking module 818 may apply a timing threshold to determine whether the content is comprehensible to a user and/or may determine a number of times that a particular part is viewed during scrubbing, or the like. In some examples, the consumption tracking module 818 may apply or may incorporate a classifier to establish a probability or confidence level for classifying each particular part of content as either consumed or not consumed. Machine learning and statistical model training may be applied to the consumption tracking module 818 to refine the classifier based on empirical data and/or feedback from users. Additionally, in some examples, the consumption tracking module 818 may employ gaze tracking or other techniques for determining, at least in part, whether a user has consumed a particular part of content.

Further, in some examples, the content item 106 may include metadata 820 that is related to content 822 of a content item 106. In some examples, the metadata 820 may receive or may contain data collected by the consumption tracking module 818 related to the consumption of various parts of the content 822. For example, the consumption tracking module 818 may store in the metadata 820 consumption logs or other information related to the parts of content 822 that have been classified as having been consumed with respect to a particular content item. For instance, the consumption logs for each content item may indicate a range of content that has been consumed with respect to a particular content item 106. The presentation module 816 may access and use the consumption logs to generate a current consumption representation for the particular content item. The consumption information and logs may be stored with the metadata 820 for a particular content item 106, may be stored in other locations on the electronic device 300, and/or may be sent to a content provider, as discussed below. In some examples, the metadata 820 may be contained in a separate file from the content 822, while in other examples, the metadata 820 may be combined with the content 822 into a single file.

The presentation module 816 may present one or more interfaces and consumption representations as described, e.g., with respect to FIGS. 3-6. Thus, in some implementations, the presentation module 816 may generate and display the consumption representations and other interfaces described herein to provide an indication of a user's progress with respect to a particular content item. In some examples, the interfaces and consumption representations may be overlaid on the content 822 by the presentation module 816 at a designated location. Further, in other examples, the provider interaction module may display the interfaces herein, such as with respect to FIGS. 1, 2 and 7. In some cases, the interfaces and consumption representations may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. In addition, graphic effects such as shapes, colored text, colored or patterned backgrounds, highlighting, outlining or other graphic effects, may be generated using any suitable coding techniques, such as HTML, JavaScript®, CSS, and various other graphics rendering software. Further, widgets, HTML, JavaScript®, and CSS are just several examples of technologies for displaying the interfaces and consumption representations described herein, and numerous other possible techniques, tools, functionalities, programming technologies, and the like will be apparent to those of skill in the art in light of the disclosure herein.

In some implementations, each content item 106 may include content 822, such as text, images, audio, video, or the like. In some examples, the content may be divided into pieces 824, one or more of which may be provided as sample content 802 in response to a request received from an electronic device 300 for a sample of a content item. For example, the delivery module 830 may provide a streaming service to send one or more pieces 824 corresponding to the selected sample content to a device 300 of a user 814. Further, to provide page-turning performance and reduction of request traffic, some implementations herein may reduce potential mismatches between a "requested range" of content of a sample and the actual "delivered range" of content of the sample. For example, if the delivery module delivers a piece 824 of content that is larger than the user's requested range for the sample, then the content provider must decide whether the entire piece length should count against the user's sample limit for the content item, rather than the requested range that the user actually requested. For example, if the pieces 824 are too large, then they may not be able to match well against the granularity of a user's requested range. Accordingly, in some examples herein, the pieces 824 may be relatively small, e.g., on the order of about a page or two of a typical content item when the content item is a book, and the entire piece length of any piece 824 delivered may be counted toward the user's sample limit even if there is some overrun outside the user's requested range.

The metadata 820 or the content 822 may further include information that identifies the locations of individual sentences, paragraphs, chapters, and so forth in the content item. In some cases, the location information included with the metadata 820 or the content 822 may be used, at least in part, to enable identification of parts of the content 822 that have been consumed and/or pieces 824 of the content to deliver as a sample to an electronic device 300. For example, the location of a word, sentence, paragraph, chapter, and so forth, may be identified by referring to the location information. Thus, during presentation of the content item 106 and or sample content 802, the presentation module 816 may use the location information, at least in part, to determine which parts of the content item have been consumed.

The content provider site 810 may include a content item store module 826 that may provide or may access a content item catalog 828. For example, the content item store module 826 may present the content item catalog 828 to the provider interaction module 812 of an electronic device 300 that accesses the content provider site 810 to shop for a content item 106. The content item catalog 828 may include searchable and/or browsable listings and descriptions of content items 106 available from the content provider site 810. The content item store module 826 may communicate with the provider interaction module 812 on the electronic device 300 to enable the user 814 to locate and acquire a content item 106 from the content provider site 810. As one example, the content item store module 826 may present the example interface 100 discussed above with respect to FIG. 1, which may include aggregated consumption information in the content representation 120 in connection with offering a content item 106 for sale, licensing, or other acquisition, and for offering a sample of the content item 106.

The content provider site 810 may further include a delivery module 830 that may deliver (or make available for delivery) a content item 106 or sample content 802 to the electronic device 300 and/or the user 814. For example, in some instances, the delivery module 830 may facilitate the download of a content item 106 to the electronic device 300 over the network(s) 808. In other instances, the delivery module 830 may provide for delivery of a hard copy of a content item 106 to the user 814, such as by delivery of a storage medium that maintains a copy of the content item, depending on the nature of the content item and the electronic device 300.

In addition, the delivery module 830 may provide a streaming service for streaming pieces 824 of a content item 106 to an electronic device 300 in response to a request for a sample received from the electronic device 300. Furthermore, in some implementations, the delivery module 830 may refer to user information 832 to determine whether the user has already sampled a particular content item 106. For example, the user information 832 may include one or more user account(s) 834. Each user account may 834 include user data 836, such as user contact information for identifying and interacting with the user, such as name, email address, mailing address, telephone number, user identification (ID) number, and the like. The user data 836 may further include a user purchase history (e.g., content items 106 and/or other items acquired by the user), usage and interaction information, a user content item library, information on various devices 300 associated with a particular user account 834. The user account 834 may further include user sample logs 838, which may indicate any content items that the user has previously sampled, whether the permissible sample limit was reached, and which parts of the content were sampled by the user. Additionally, in some cases, the delivery module 830 may assist in synchronizing the content of multiple devices 300 associated with a user or a user account, such as for delivering and synchronizing multiple instances of a content item 106 on multiple devices 300 associated with a single account.

In some examples, the electronic device 300 may send consumption information 840 to the content provider 804 for inclusion with other information in the user's account 834. For instance, the consumption information 840 may include information indicating which parts of content have been consumed by a user for each content item 106 accessed by the user 814. Thus, in the case of a book, the consumption information 840 may indicate at least locations in the book of content parts that were consumed by the user. In some examples, the consumption information 840 may further indicate an amount of time that the user spent consuming each part of content.

In some examples, the consumption information 840 of a plurality of different users associated with different user accounts may be collected and aggregated as aggregated consumption information 842 to determine which parts of content are popularly or most frequently consumed for a particular content item, as discussed above with respect to FIG. 1. The aggregated consumption information 842 may then be used for various purposes, such as for suggesting to subsequent users parts of the content item to sample during shopping, or merely to inform users as to which parts of a content item are most popularly consumed by other users. Further, the consumption information 840 for a particular user account may be used to synchronize or merge the consumption of a user on a first user device 300 with other instances of a particular content item on other devices 300 associated with the particular user's account.

The content provider site 810 may also include or may access a content item library 844. For example, the content item library 844 may include a plurality of content items 106 that the content provider 804 has available for access by electronic devices 300, such as by purchase through the content items catalog 828. Each content item 106 in the content item library 844 may include both content 822 and metadata 820 corresponding to the content. In some examples, the content item library 844 may contain hundreds of thousands of unique content items 106, including a variety of eBooks, such as fiction, non-fiction, and so forth, as well as media content items, multimedia content items, mixed media content items, and so forth.

Further, in some implementations, a content item 106 to be delivered may be provided to a third party, such as a wireless provider that sends the content item 106 to the electronic device 300. Accordingly, an intermediary, such as a wireless network provider (not shown), or the like, may make the content item 106 available for delivery to a particular electronic device 300, or may otherwise provide the content item to the particular electronic device 300, and may further provide for synchronization of metadata, such as the consumption information 840, to other devices 300 of a user. For purposes of this disclosure, "providing" or "making available" by the content provider may include any intermediaries that perform delivery of the content items and/or information related to the content items, such as in metadata 820.

The content provider site 810 may also include various other site components as is known, depending on the design and intended use of the content provider site 810. Such other site components may include one or more pages of content, such as webpages, webviews, or other online content, that may be presented to the user 814 through the provider interaction module 812, such as during shopping for content items 106 from the content provider site 810.

The content provider site 810 may further include a sample management module 846 that may be employed in some implementations for managing sample pieces 848 that may be streamed to an electronic device 300 to provide a sample part of a content item 106, as discussed above, e.g., with respect to FIGS. 1 and 2. In some examples, when the user 814 of the electronic device 300 requests a sample of a particular content item 106, such as by submitting a request 850, the delivery module 830 may deliver one or more sample pieces 848 that correspond to the user's requested range of sample content. Additionally, there may be a situation in which the publisher or author specifies a portion that may not be permitted to be sampled in the time between when a share message was sent, and when the receiver of the share message requests the shared content. For example, a shared start location may have been marked as "unsampleable" by the publisher or author. Accordingly, the delivery module may send other sample pieces, but may not include a sample piece corresponding to the start location that is now not permitted to be sampled.

Furthermore, based at least in part on the size of the sample pieces 848 sent to the electronic device 30, the delivery module 830 may send sample consumption information 852. For example, the sample consumption information 852 may be used to generate a sampled content representation 212 as described above with reference to FIG. 2. Additionally, the sample consumption information 852 may be used to inform the user of the amount of sample content received, such as by display of the indicator 228, and/or the amount of sample content that the user may still access, such as by display of the indicator 230.

Additionally, the sample management module 846 may aggregate the consumption information 840 collected from a plurality of users 814 and a plurality of devices 300 associated with different user accounts as the aggregated consumption information 842. The sample management module 846 may determine which parts of a particular content item are consumed most frequently, and may provide this aggregated consumption information 842 to the content item store module 826 and/or the delivery module 830. For example, when a user accesses the interfaces 100, 200, 502, and 700, the user may be presented with information as to which parts of a content item users popularly consume, such by displaying the aggregated consumption content representation 120 of FIG. 1 for the content item.

The network(s) 808 may further connect the content provider computing device(s) 806 with one or more microblog site computing devices 854, one or more social network computing devices 856 and/or one or more devices 858 of other users. In some examples, the request 850 from the electronic device 300 may include a sharing request to share a sample part of content with another user or to post a link to the sample part of content on a site. The sample management module 846 may receive the sharing request and establish a link that one or more other users may follow to access the sample content specified in the sharing request. The sample management module 846 may then forward the link to a specified user, such as to the device 858 of another user. Alternatively, if the sharing request instructs the content provider to post the link to a microblog site social network sites or the like, the sample management module 846 may forward the link to the site 854 and/or 856 specified in the request 850. Further, in some cases, the link may be returned to the requesting user in response to the request, and the requesting user may share the link, post the link, or the like.

Example Electronic Device

Figure 9:
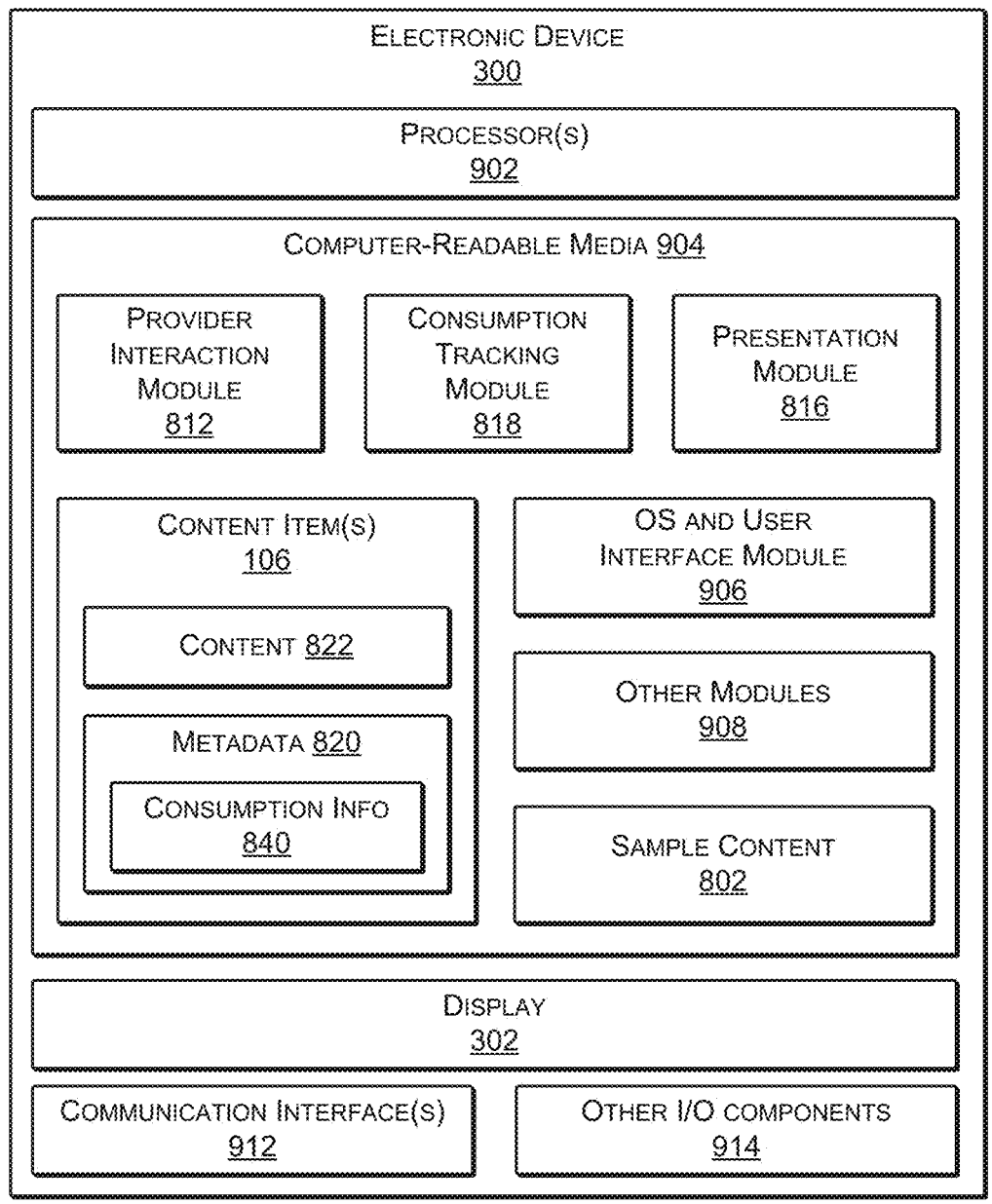
FIG. 9 illustrates select components of an example electronic device according to some implementations.

FIG. 9 illustrates select example components of the electronic device 300 that may be used to implement the functionality described above according to some implementations. In a very basic configuration, the electronic device 300 includes, or accesses, components such as at least one control logic circuit, central processing unit, or processor 902 and one or more computer-readable media 904. Each processor 902 may itself comprise one or more processors or processing cores. Depending on the configuration of the electronic device 300, the computer-readable media 904 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 902 directly or through another computing device. Accordingly, the computer-readable media 904 may be computer-readable media able to store and maintain instructions, modules or components executable by the processor 902.

The computer-readable media 904 may be used to store any number of functional components that are executable by the processor 902. In some implementations, these functional components comprise instructions or programs that are executable by the processor 902 and that, when executed, implement operational logic for performing the actions attributed above to the electronic device 300. Functional components of the electronic device 300 stored in the computer-readable media 904 may include the presentation module 816, which may be executed by the processor 902 for presenting one or more content items 106 and associated consumption representations, and the consumption tracking module 818, which may determine which parts of a content item have been consumed by a user. Additional functional components stored in the computer-readable media 904 may include the provider interaction module 812, executable by the processor 902 for obtaining the content item(s) 106, including content 822 as well as any corresponding metadata 820. Either the provider interaction module 812 or the presentation module may receive and display sample content 802, as well as displaying sample consumption information (not shown in FIG. 9) received from the content provider related to the consumption of sample content 802. Other functional components may include an operating system and user interface module 906 for controlling and managing various functions of the electronic device 300. Depending on the type of the electronic device 300, the computer-readable media 904 may also optionally include other functional components, such as other modules 908, which may include applications, programs, drivers and so forth.

The computer-readable media 904 may also store data, data structures, and the like that are used by the functional components. For example, data stored by the computer-readable media 904 may include one or more content items 106. Each content item 106 may include content 822 and metadata 820, which may be contained in a single file or in multiple files. The computer-readable media 904 may further maintain consumption information 840, which may include information as to which parts of each content item have been consumed. In some examples, the consumption information 840 may be maintained with the metadata 820 for each content item 106, while in other examples, the consumption information 840 may be maintained separate from the content items 106 and accessed when a particular content item is accessed. The computer-readable media 904 may further include the sample content 802. The electronic device 300 may also include other data, which may include, for example, data used by the provider interaction module 812, the operating system and user interface module 906, and the other modules 908. Further, the electronic device 300 may include many other logical, programmatic and physical components, of which those described are merely examples that are related to the discussion herein.

FIG. 9 further illustrates the display 302, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 302 may be an active display such as a liquid crystal display, plasma display, light emitting diode display, organic light emitting diode display, and so forth. These displays may comprise drive electronics, such as a display drive matrix configured to affect individual pixels within the display 302. Additionally, in some implementations, the display 302 may be a 3D display capable of providing a 3D image. For example, the display 302 may produce a 3D image by providing alternating left-eye and right-eye images with or without the use of shuttering or filtering eyeglasses. Accordingly, in some implementations, the content items and user interface components herein may be rendered in 3D.

One or more communication interfaces 912 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 912 may allow a user of the electronic device 300 to access the World Wide Web, download content items from the content provider site 810, access online content, such as from a website or other network location, and the like. The communication interface 912 may further allow a user to access storage on another device, such as a user's computing device, a network attached storage device, cloud storage, or the like.

The electronic device 300 may further be equipped with various other input/output (I/O) components 914. Such I/O components may include a touchscreen and various user controls (e.g., buttons, a joystick, a keyboard, a mouse, etc.), speakers, a microphone, a camera, connection ports, and so forth. For example, the operating system 906 of the electronic device 300 may include suitable drivers configured to accept input from a keypad, keyboard, or other user controls and devices included as the I/O components 914. For instance, the user controls may include page turning buttons, navigational keys, a power on/off button, selection keys, and so on. Additionally, the electronic device 300 may include various other components that are not shown, examples of which include removable storage, a power source, such as a battery and power control unit, a global positioning system (GPS) device, a PC Card component, and so forth.

Example Computing Device(s)

Figure 10:
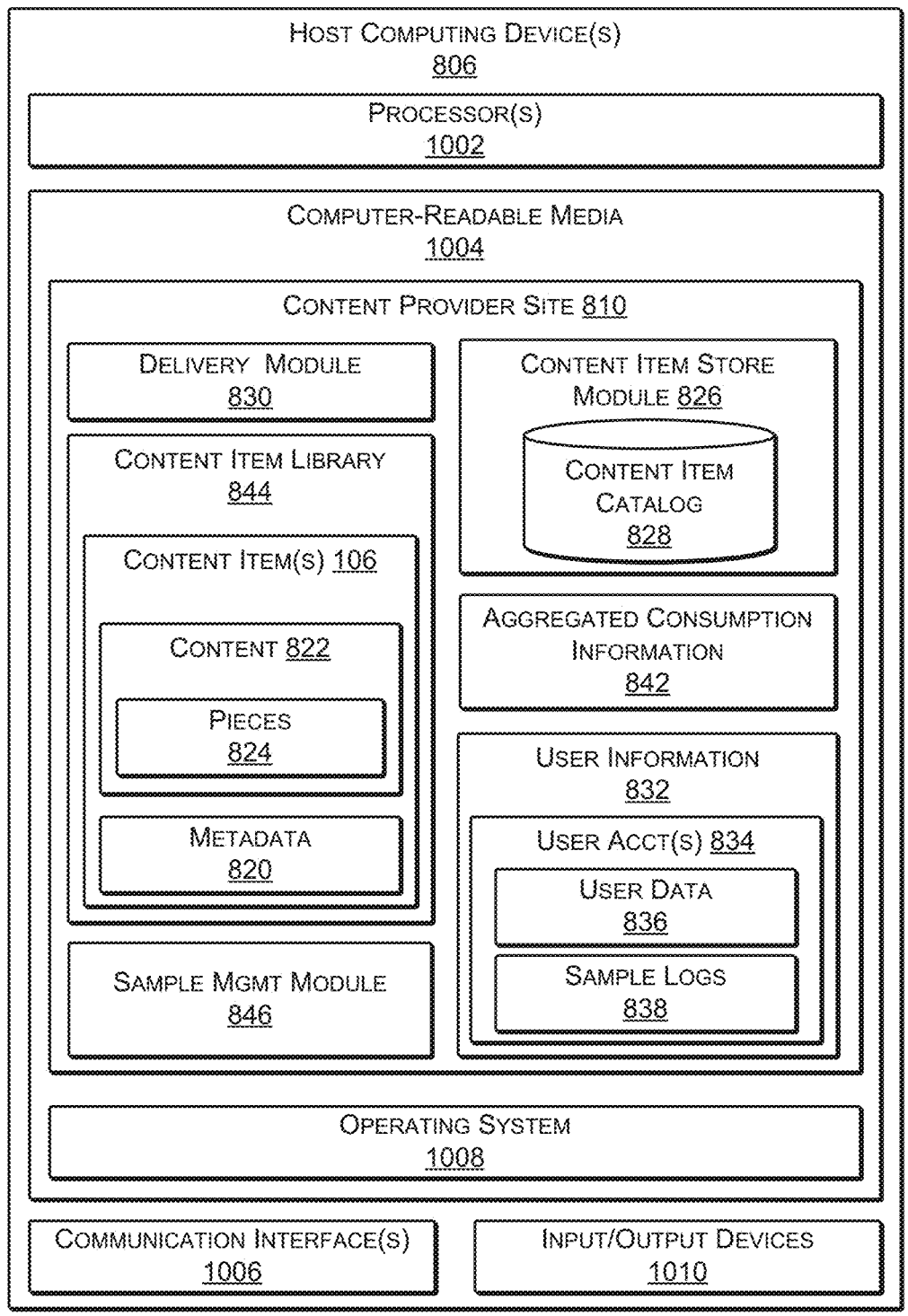
FIG. 10 illustrates select components of one or more example host computing devices of a content provider according to some implementations.

FIG. 10 illustrates select components of one or more host computing devices 806 that may be used to implement the functionality of the content provider site 810 according to some implementations. The content provider site 810 may be hosted on one or more servers or other types of computing devices that may be embodied in any number of ways. For instance, in the case of a server, the content provider site 810 may be implemented on a single server, a cluster of servers, a server farm or data center, a cloud hosted computing service, and so forth, although other computer architectures (e.g., a mainframe architecture) may also be used. Further, while the figures illustrate the components of the content provider site 810 as being present in a single location, it is to be appreciated that these components may be distributed across different computing devices and locations in any manner. Generally, the content provider site 810 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 10, an example host computing device 806 includes one or more processors 1002, one or more computer-readable media 1004, and one or more communication interfaces 1006. The processor(s) 1002 may be a single processing unit or a number of processing units, and may include single or multiple computing units, or multiple processing cores. The processor(s) 1002 can be configured to fetch and execute computer-readable instructions stored in the computer-readable media 1004 or other computer-readable media.

The computer-readable media 1004 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 806, the computer-readable media 1004 may be a type of computer-readable storage media and may be a tangible non-transitory storage media.

The computer-readable media 1004 may be used to store any number of functional components that are executable by the processors 1002. In many implementations, these functional components comprise instructions or programs that are executable by the processors 1002 and that, when executed, implement operational logic for performing the actions attributed above to the content provider site 810 and content provider 804. Functional components of the content provider site 810 that may be executed on the processors 1002 for implementing the various functions and features related to providing content items and consumption representations, as described herein, include the content item store module 826, the delivery module 830, and the sample management module 846. Additional functional components stored in the computer-readable media 1004 may include an operating system 1008 for controlling and managing various functions of the host computing device(s) 806.

In addition, the computer-readable media 1004 may include, or the host computing device(s) 806 may access, data that may include the content item library 844, including one or more content items 106. The data may further include the user information 832, including information for one or more user accounts 834. In addition, the computer-readable media 1004 may store or the host computing devices(s) 806 may access the content item catalog 828 used by the content item store module 826. The host computing device(s) 806 may also include many other logical, programmatic and physical components, of which those described above are merely examples that are related to the discussion herein.

The communication interface(s) 1006 may include one or more interfaces and hardware components for enabling communication with various other devices, such as the electronic devices 300, over the network(s) 808. For example, communication interface(s) 1006 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 808 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 806 may further be equipped with various input/output devices 1010. Such I/O devices 1010 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 11-14 illustrate example processes related to sampling of a content item according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 11 is a flow diagram illustrating an example process that may be executed by an electronic device for sampling one or more parts of a content item according to some implementations.

At 1102, the electronic device may receive a first part of a content item as a first sample and a second part of a content item as a second sample. For example, the first part of the content item may be noncontiguous with the second part of the content item. Accordingly, a user may select a first part of a content item to sample in a manner that is nonlinear in relation to selecting a second part of the content item to sample.

At 1104, the electronic device may display a representation of the content of the content item. For example, the representation may indicate a location in the content of at least the first sample and the second sample.

Figure 12:
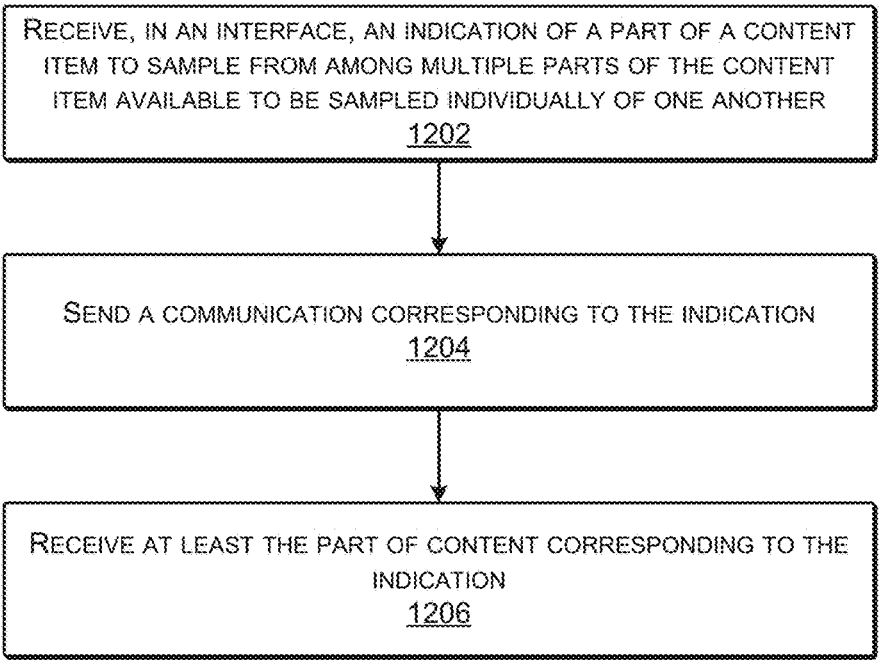
FIG. 12 is a flow diagram illustrating an example process that may be executed by an electronic device for sampling a part of content has been consumed according to some implementations.

FIG. 12 is a flow diagram illustrating an example process that may be executed by an electronic device for sampling a part of a content item according to some implementations.

At 1202, the electronic device may receive, in an interface, an indication of a part of the content item to sample from among multiple parts of the content item available to be sampled individually of one another. For example, the user may select a plurality of parts of the content item to be sampled and each part may be selected individually and independently of another part of the content item to be sampled.

At 1204, the electronic device may send a communication corresponding to the indication. For example, the electronic device may send a communication to the content provider indicating a part of the content item requested as a sample.

At 1206, the electronic device may receive at least the part of content corresponding to the indication. For example, the content provider may send to the electronic device the requested part of the content as a sample. The electronic device may receive the sample and display the sample on a display of the electronic device.

FIG. 13 is a flow diagram illustrating an example process that may be executed by a computing device of a content provider in connection with providing a sample of a content item according to some implementations.

At 1302, the computing device receives, from a device, an indication of at least a start location, within content of a content item, of a part of the content to sample. For example, the start location may be one of a plurality of start locations available within the content of the content item.

At 1304, the computing device sends the part of the content to the device. For example, the computing device may identify one or more pieces of content that correspond to the selected start location, and may stream or otherwise send the one or more pieces to the requesting device.

Figure 14:
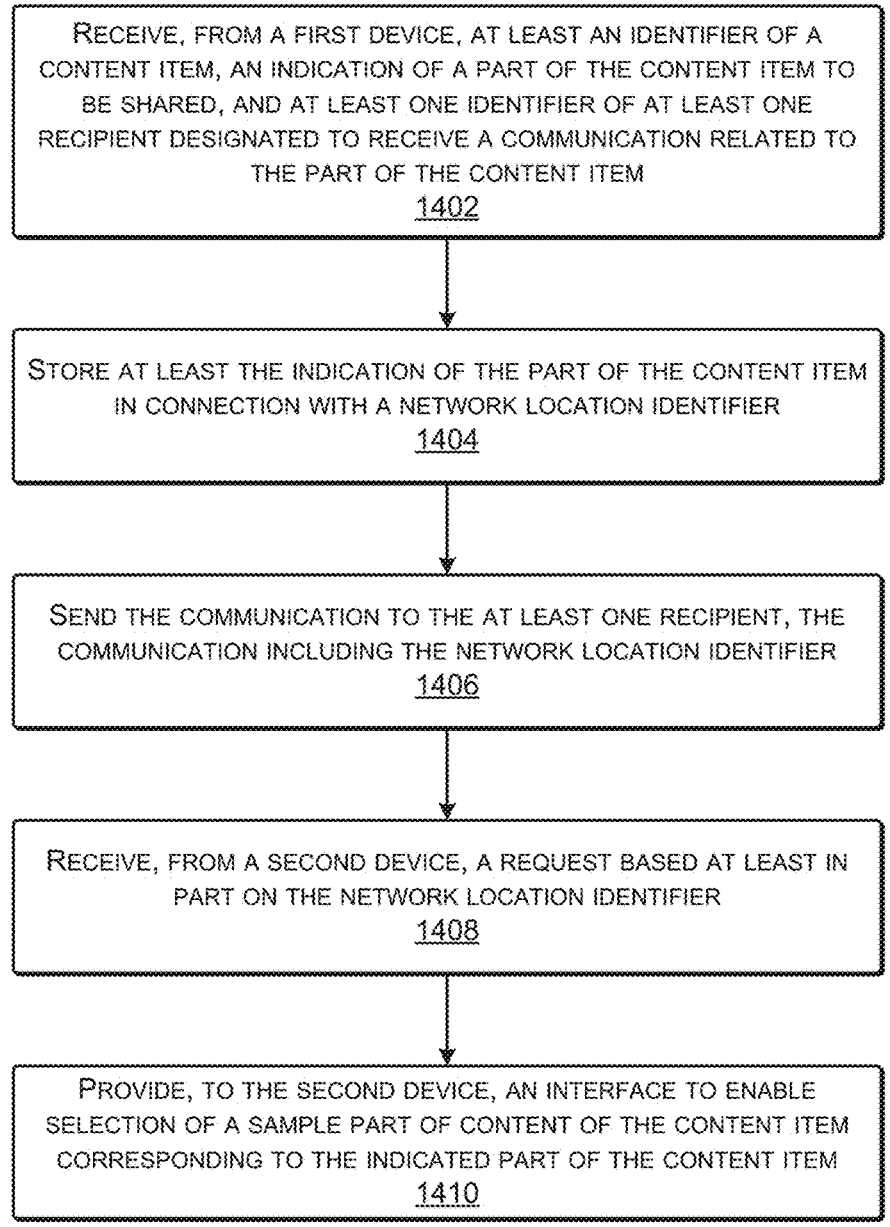
FIG. 14 is a flow diagram illustrating an example process that may be executed by a computing device of a content provider in connection with providing a sample of a content item in response to a sharing request according to some implementations

FIG. 14 is a flow diagram illustrating an example process that may be executed by a computing device of a content provider in connection with providing a sample of a content item in response to a sharing request according to some implementations.

At 1402, the computing device receives, from a first device, at least an identifier of a content item, an indication of a part of the content item to be shared, and at least one identifier of at least one recipient designated to receive a communication related to the part of the content item. For example, a first user may identify a portion of the content item to be shared, and may further identify at least one recipient to receive the portion of content to be shared.

At 1404, the computing device stores at least the indication of the part of the content item in connection with a network location identifier. For example, the computing device may establish a link for sharing the identified portion of the content item.

At 1406, the computing device sends a communication to the at least one recipient. For example, the communication may include the network location identifier, e.g., a link, created by the content provider to access the shared portion of the content.

At 1408, the computing device receives, from a second device, a request based at least in part on the network location identifier. For example, a user of a second device may click on the link, or otherwise select the link, to access an interface to access the shared portion of content.

At 1410, the computing device provides, to the second device, an interface to enable selection of a sample part of content of the content item corresponding to the indicated part of the content item. For example, the computing device of the content provider may enable the second user to access the shared portion of content through the sampling techniques discussed above.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
a display;
one or more processors; and
one or more computer-readable media storing computer-readable instructions that, when executed, cause the one or more processors to perform operations including:
displaying, on the display, a user interface including a first portion corresponding to a content item and a second portion corresponding to sample pages of the content item, the first portion visually distinguished from the second portion, the second portion to indicate a location, relative to the content item, of the sample pages of the content item;
receiving an indication of a selection of the second portion;
sending a communication corresponding to the indication;
receiving the sample pages of the content item;
displaying a visual indicator of at least one of (i) an amount of the content item that has been obtained as sample content or (ii) an amount of the content item remaining to be obtained as sample content prior to reaching or exceeding a threshold amount; and
displaying, based at least in part on receiving the indication of the selection of the second portion, an indication of a range of pages corresponding to the sample pages of the content item.

2. The device as recited in claim 1, wherein the user interface comprises a bar, the bar including the first portion visually distinguished from the second portion, the second portion to indicate a location, relative to the content item, of the sample pages of the content item.

3. The device as recited in claim 1, the operations further comprising:
displaying a handle moveable along the second portion to represent a location of a page or frame of the content item currently displayed on the display; and
displaying at least one filler page or frame when the handle is located over the first portion.

4. The device as recited in claim 1, wherein the sample pages of the content item includes at least one of:
a part of the content item that is consumed more frequently than at least one other part of the content item;
a part of the content item that has been highlighted by a plurality of users;
a part of the content item that has been at least one of consumed,
highlighted, or annotated by a particular person other than a user of the device;
a part of the content item that has been annotated by a plurality of users; or
a part of the content item that was mentioned on at least one of a social network site or a microblog site.

5. The device as recited in claim 1, wherein displaying the visual indicator of the amount of the content item that has been obtained as sample content comprises displaying a percentage of the content item that has been obtained as sample content.

6. The device as recited in claim 1, wherein the content item includes at least one of:
text content;
interactive content;
video content; or
audio content.

7. The device as recited in claim 1, wherein the sample content corresponds to a part of a content item that has not been redacted.

8. A device comprising:
one or more processors;
one or more computer-readable media; and
one or more modules maintained on the one or more computer-readable media and executed by the one or more processors to perform operations including:
displaying a user interface, the user interface including a first portion corresponding to a content item and visually distinguished from a second portion corresponding to a location, relative to the content, of a part of the content available to be received as sample pages of the content item;
receiving an indication of a selection of the second portion;
sending a communication corresponding to the indication;
receiving the sample pages of the content item; and
displaying, based at least in part on receiving the indication of the selection of the first portion, an indication of a range of pages corresponding to the sample pages of the content item.

9. The device as recited in claim 8, wherein the sample pages of the content item corresponds to at least one of:
a part of the content item that is consumed more frequently than at least one other part of the content item;
a part of the content item that has been highlighted by a plurality of users;
a part of the content item that has been at least one of consumed, highlighted or annotated by a particular person other than a user of the device;
a part of the content item that has been at least one of highlighted or annotated by the user of the device;
a part of the content item that has been annotated by a plurality of users; or
a part of the content item that was mentioned on at least one of a social network site or a microblog site.

10. The device as recited in claim 8, wherein a start location identifies a beginning of the sample content.

11. One or more non-transitory computer-readable media maintaining instructions executable by one or more processors to perform operations comprising:
displaying a graphical component, the graphical component having a first portion corresponding to a content item and a second portion corresponding to a sample of the content item, wherein the second portion of the graphical component is visually distinguished from the first portion of the graphical component;

receiving, in an interface, an indication of selection of the second portion of the graphical component;

sending a communication corresponding to the indication;

receiving the sample of the content item; and displaying, based at least in part on receiving the indication of the selection of the first part, an indication of a range of pages corresponding to the sample of the content item.

12. The one or more non-transitory computer-readable media as recited in claim 11, the operations further comprising displaying at least one of:

an amount of sample content of the content item that has been received; or an amount of sample content of the content item remaining in a permitted amount of the sample content allowed to be obtained.

13. The one or more non-transitory computer-readable media as recited in claim 11, wherein the graphical component includes at least one of a bar graph, a pie chart, a pie graph, a histogram or a heat map.

14. The one or more non-transitory computer-readable media as recited in claim 11, further comprising:

displaying a handle moveable along the graphical component to represent a location of a page or frame of content currently displayed on a display; and displaying at least one filler page or frame when the handle is located over a portion of the graphical component that does not correspond to the sample.

15. The one or more non-transitory computer-readable media as recited in claim 11, wherein the sample of the content item includes at least one of:

a part of the content item that is consumed more frequently than at least one other part of the content item;

a part of the content item that has been highlighted by a plurality of users;

a part of the content item that has been at least one of consumed, highlighted, or annotated by a particular person other than a user of the device;

a part of the content item that has been annotated by a plurality of users; or a part of the content item that was mentioned on at least one of a social network site or a microblog site.

16. The one or more non-transitory computer-readable media as recited in claim 11, wherein the graphical component further includes a third portion corresponding to as a second sample of the content item.

17. The one or more non-transitory computer-readable media as recited in claim 11, wherein the indication of selection of the sample of the content item comprises an indication of a start location of the sample of the content item.

18. The one or more non-transitory computer-readable media as recited in claim 11, wherein the content item includes at least one of:

text content;

interactive content;

video content; or audio content.

* * * * *